(12) United States Patent  
Khakare et al.

(10) Patent No.: US 11,074,165 B2  
(45) Date of Patent: Jul. 27, 2021

(54) GENERATING TESTING INFRASTRUCTURE ON A CLOUD FOR TESTING SOFTWARE APPLICATIONS

(71) Applicant: Hitachi Vantara LLC, Santa Clara, CA (US)

(72) Inventors: Ganesh Khakare, Pune (IN); Sanju Burkule, Lohegoan (IN); Gunanand Nagarkar, Pune (IN); Tapasvi Kaza, Reston, VA (US); Sri Vasireddy, Leesburg, VA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 0 days.

(21) Appl. No.: 16/647,362

(22) PCT Filed: Oct. 29, 2018

(86) PCT No.: PCT/US2018/057976  
§ 371 (c)(1),  
(2) Date: Mar. 13, 2020

(87) PCT Pub. No.: WO2019/089446  
PCT Pub. Date: May 9, 2019

(65) Prior Publication Data  
US 2020/0278920 A1   Sep. 3, 2020

Related U.S. Application Data

(60) Provisional application No. 62/578,611, filed on Oct. 30, 2017.

(51) Int. Cl.  
*G06F 9/44* (2018.01)  
*G06F 11/36* (2006.01)  
(Continued)

(52) U.S. Cl.  
CPC ........ *G06F 11/3688* (2013.01); *G06F 3/0482* (2013.01); *G06F 3/0486* (2013.01);  
(Continued)

(58) Field of Classification Search  
None  
See application file for complete search history.

(56) References Cited

U.S. PATENT DOCUMENTS

| | | | |
|---|---|---|---|
| 2013/0019242 A1* | 1/2013 | Chen ................. | H04L 41/145 718/1 |
| 2014/0026122 A1* | 1/2014 | Markande ........... | G06F 11/3688 717/124 |

(Continued)

OTHER PUBLICATIONS

International Search Report in International Application No. PCT/US2018/057976 dated Jan. 15, 2019.

*Primary Examiner* — Qamrun Nahar  
(74) *Attorney, Agent, or Firm* — Mattingly & Malur, PC

(57) ABSTRACT

Systems and methods to generate testing infrastructure on a cloud for testing software (e.g. an application that runs in a cloud hosted by an AWS server). In one approach, a method includes: generating testing infrastructure on a cloud; and testing, using the testing infrastructure, an application. The method further includes instantiating a browser in the testing infrastructure; importing at least one test case from a repository; and executing the at least one test case for the application.

17 Claims, 24 Drawing Sheets

(51) Int. Cl.
*G06F 8/61* (2018.01)
*G06F 3/0481* (2013.01)
*G06F 3/0482* (2013.01)
*G06F 3/0486* (2013.01)
*G06F 8/35* (2018.01)
*G06F 9/455* (2018.01)
*G06F 9/54* (2006.01)
*H04L 12/46* (2006.01)

(52) U.S. Cl.
CPC ............ *G06F 3/04817* (2013.01); *G06F 8/35* (2013.01); *G06F 8/61* (2013.01); *G06F 9/45558* (2013.01); *G06F 9/547* (2013.01); *G06F 11/3664* (2013.01); *G06F 11/3684* (2013.01); *H04L 12/4641* (2013.01); *G06F 2009/45595* (2013.01)

(56) References Cited

U.S. PATENT DOCUMENTS

2014/0157050 A1* 6/2014 Zhao .................... G06F 11/263
714/28
2015/0269064 A1* 9/2015 Bishop ................ G06F 11/3664
717/124
2015/0278517 A1 10/2015 Weaver et al.

* cited by examiner

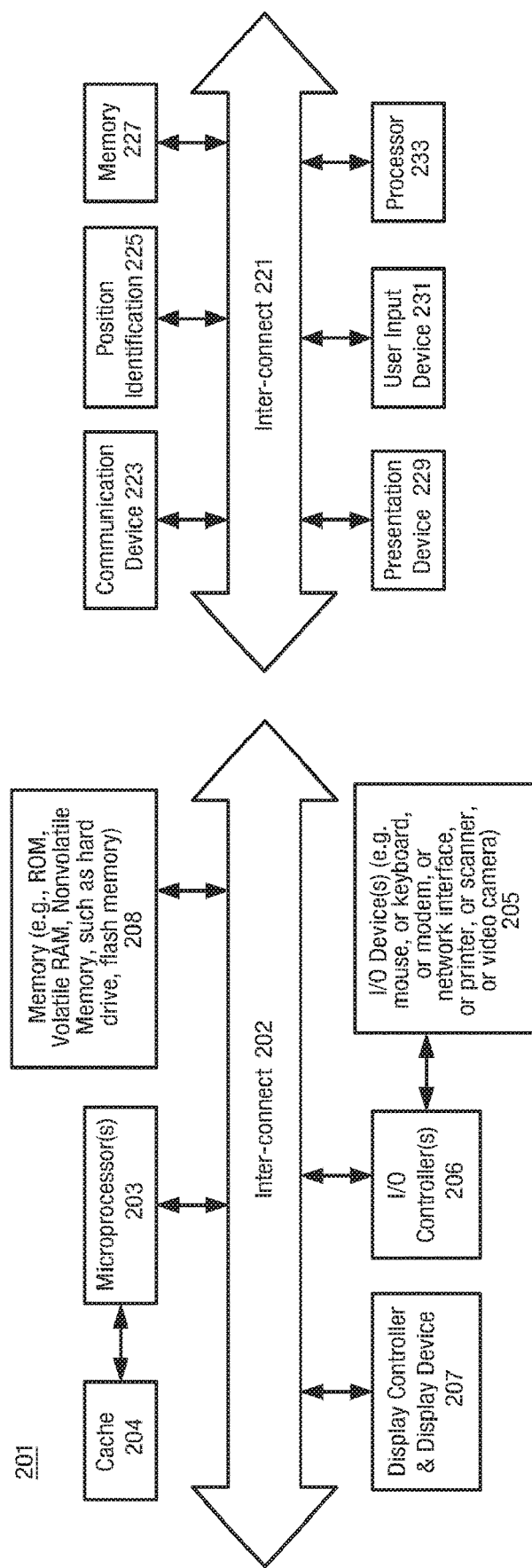

| REAN Deploy | Dashboard | QuickTest | Automated Tests | ScaleNow | Infra ▾ | Schedule | Scans |

Security Test

Select Browser(s): Chrome: 0 ▾  Firefox: 0 ▾

Application URL: [                    ]

Security Packs: ☑ App Scan  ☑ Http Headers

App Scan Pack — Automated Application Security Scanning Run automated application level tests against the application using OWASP ZAP
- The application should not contain SQL injection vulnerabilities
- The application should not contain Cross Site Scripting vulnerabilities
- The application should not contain path traversal vulnerabilities
- The application should not contain remote file inclusion vulnerabilities
- The application should not contain Server side include vulnerabilities
- The application should not contain Server side code injection vulnerabilities
- The application should not contain Remote OS Command injection vulnerabilities
- The application should not contain CRLF injection vulnerabilities
- The application should not contain external redirect vulnerabilities
- The application should not disclose source code
- The application should not be vulnerable to Shell Shock
- The application should not be vulnerable to XPATH injection
- The application should not be vulnerable to Xml External Entity Attacks
- The application should not be vulnerable to the Generic Padding Oracle attack
- The application should not expose insecure HTTP methods

HTTP Headers Pack — Http Headers Feature: Security settings on HTTP headers Verify that HTTP headers adequately protect data from attackers
- Restrict other sites from placing it in a iframe in order to prevent ClickJacking attacks
- Enable built in browser protection against Cross Site Scripting
- Force the use of HTTPS for the base URL
- Restrict HTML5 Cross Domain Requests to only trusted hosts
- Enable anti-MIME sniffing prevention in browsers

[ Schedule ] [ Test Now ]

About   Privacy Policy   Terms

GENERATING TESTING INFRASTRUCTURE ON A CLOUD FOR TESTING SOFTWARE APPLICATIONS

RELATED APPLICATIONS

This application is a U.S. 371 National Phase Patent Application of PCT/US2018/057976, filed Oct. 29, 2018, which claims priority to and the benefit of U.S. Provisional Application Ser. No. 62/578,611, filed Oct. 30, 2017, entitled "SYSTEMS AND METHODS TO GENERATE INFRASTRUCTURE AS CODE (IAC) FOR DEPLOYING CLOUD INFRASTRUCTURE," by KHAKARE et al., the entire disclosure of each of which applications are incorporated herein by reference.

The present application is related to PCT International Application No. PCT/2018/057970 filed on Oct. 29, 2018, and entitled "GENERATING CODE FOR DEPLOYING CLOUD INFRASTRUCTURE", the entire disclosure of each of which applications are hereby incorporated herein by reference.

FIELD OF THE TECHNOLOGY

At least some embodiments disclosed herein relate to testing in a cloud in general, and more particularly, but not limited to, generating a testing infrastructure in the cloud for testing a software application.

BACKGROUND

Software testing is sometimes used to assess the performance of software products. Testing of software can include verifying the reliability of the software. In some cases, test cases are executed to determine whether the software will execute without failure. In one example, tests are used to identify defects (such as buffer overflows) that may take sustained operation to cause a fault or failure to occur.

The distribution of test cases can match the planned operational profile of the software. For example, the more often a function(s) of the software is executed, the larger the percentage of test cases that can be allocated to that function(s).

SUMMARY OF THE DESCRIPTION

Systems and methods to generate testing infrastructure in a cloud (e.g., hosted by one or more servers in an AWS cloud) for testing software (e.g., an application with a web interface) are described herein. Some embodiments are summarized in this section.

In various embodiments, cloud test software is provided. In some embodiments, the cloud test software can be used in conjunction with the cloud deploy software described below. In one embodiment, the cloud test software is a cloud-based test automation accelerator that identifies cloud infrastructure needed for testing and dynamically creates the test infrastructure for test execution (e.g., the test infrastructure is created just-in-time or in real-time).

The cloud test software can perform rapid, parallel, cross-browser functional, performance, scale and security testing. The cloud test software can test created cloud infrastructure to verify the created cloud infrastructure meets blueprint requirements. Cloud test software can also integrate plug-ins to perform functions such as test automation with third party test applications and continuous testing after each build. Tests can be scheduled with cloud test software to start at specific times and to repeat for synchronous or asynchronous testing. To reduce testing cost, cloud test software can automatically release test infrastructure when testing is complete.

Prior approaches to performing parallel and cross-browser cloud testing involved manually creating cloud based infrastructure, installing browser and cloud test software on each instance and repeating tests for each browser version with as many client instances as required for load testing. Cloud test software accelerates testing by automating test infrastructure creation, browser and test software installation, and running tests. It is novel in its ability to automatically create test infrastructure, automate running tests in parallel using multiple browsers and browser versions, schedule synchronous and asynchronous test cycles, initiate security scans using third party software and aggregate parallel test results. This test automation can speed up problem identification and resolution and help developers get cloud applications up and running faster.

In various other embodiments, cloud deploy software is also provided. As mentioned above, the cloud deploy software can be used in conjunction with the cloud test software. The cloud deploy software can be used to generate, for example, infrastructure as code (e.g., IaC can be provided in the form of one or more files). In one embodiment, the cloud deploy software is a deployment automation accelerator allowing complex cloud environments to be automatically generated, deployed and configured in a consistent and repeatable manner. It accomplishes this by defining cloud environments in pre-built configuration blueprints or custom-built blueprints created by selecting blueprint components in a visual drag and drop tool.

In one embodiment, blueprint component icons (e.g., icons presented to a user in a user interface) represent blocks of software code needed to instantiate or configure cloud provider, provisioner or application package components. Blueprints can be deployed to the cloud or can be exported to generate IaC. Deploying to the cloud instantiates all the blueprint components as cloud infrastructure and makes the infrastructure and applications defined in the blueprint available to the user. Exporting IaC code generates a file that defines all the resources and code needed to instantiate a cloud solution defined by a blueprint.

The cloud deploy software can provide the ability to generate infrastructure deployment code that can be used independently of the cloud deploy software used to create cloud infrastructure. Cloud deploy software also includes parameters that enable replicating blueprint deployments to multiple environments without having to build each environment from scratch (e.g., development, test and production). In one embodiment, cloud test software executes testing on cloud infrastructure created by cloud deploy software to verify the instantiated cloud infrastructure conforms to blueprint requirements.

In one embodiment, a cloud deploy software accelerator (sometimes referred to herein more generally as cloud deploy software) is software that allows users to take advantage of default (out-of-the-box) solution blueprints to generate Infrastructure as Code (IaC) for deploying cloud infrastructure. In one embodiment, cloud deploy software is a software executing on a computing device (e.g., a user device) that provides a user interface for the user to specify characteristics used to create a blueprint.

In one embodiment, the cloud deploy software is software executing on a server (e.g., server 123 of FIG. 9) that provides a process to a user device (e.g., user terminal 145 of FIG. 9). The software generates code for a blueprint and controls or assists in deployment to a cloud environment (e.g., cloud 125 of FIG. 9).

In one embodiment, cloud deploy software uses a process to generate cloud infrastructure using a repeatable and accelerated methodology that helps design desired infrastructure and application architecture, assess and manage resource and software dependencies, and finally architect the proper placement and sequence via drag and drop functionality. In one embodiment, the cloud deploy software executes on server 123 of FIG. 9 and provides a service to a user on a user computing device. The steps involved in the process (which is described in more detail below) are as follows:

STEP 1—Log into cloud deploy software
STEP 2—Select Solution Blueprint
STEP 3—Import Solution Blueprint
STEP 4—Modify the Solution Blueprint using Graphical User Interface (GUI)
STEP 5—Generate Infrastructure as Code (IaC) for the blueprint In one embodiment, a method implemented in a data processing system creates a blueprint (e.g., the Solution Blueprint above), generates code (e.g., IaC above) based on the blueprint, and deploys an infrastructure to a cloud environment.

In one embodiment, the code comprises scripts. Server 123 of FIG. 9 executes the scripts to deploy the infrastructure on a cloud service (e.g., AWS).

In one embodiment, the blueprint is created in a user interface executing on a user computing device. The user interface provides drag-and-drop functionality for the user to add and/or remove components to and from the blueprint. The user interface permits the user to enable or activate generation of the code (e.g., IaC). The user may also activate deployment to the cloud from the user interface.

In one embodiment, a server (e.g., a cloud platform executing on server 123) executes software to provide a process for deploying secure and governance-ready cloud workloads with design-driven drag-and-drop capabilities to generate IaC. This process uses blueprint catalogs and pipelines that enable a user or enterprise to accelerate migration of an application or big-data workload to a cloud with improved governance.

The disclosure includes methods and apparatuses which perform these methods, including data processing systems which perform these methods, and computer-readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 3 shows a solution catalog according to one embodiment.

FIG. 4 shows progress in importing blueprint components according to one embodiment.

FIG. 10 shows a block diagram of a data processing system which can be used in various embodiments (e.g., as server 123 of FIG. 9).

FIG. 11 shows a block diagram of a user device according to one embodiment (e.g., a user computing device to provide a user interface to a user that is creating a blueprint and/or that is configuring testing for a testing infrastructure and/or using a dashboard for cloud test software).

FIG. 12 shows a cloud test software dashboard according to one embodiment.

FIG. 14 shows test selection according to one embodiment.

FIG. 15 shows a uniform resource locator (URL) test screen according to one embodiment.

FIG. 17 shows a security test screen according to one embodiment.

FIG. 18 shows a user interface performance analysis test screen according to one embodiment.

FIG. 19 shows a cross browser test screen according to one embodiment.

FIG. 20 shows a scale test screen according to one embodiment.

FIG. 21 shows an infrastructure test screen according to one embodiment.

FIG. 22 shows a test scheduling screen according to one embodiment.

FIG. 23 shows a security scan screen according to one embodiment.

DETAILED DESCRIPTION

Figure 1:
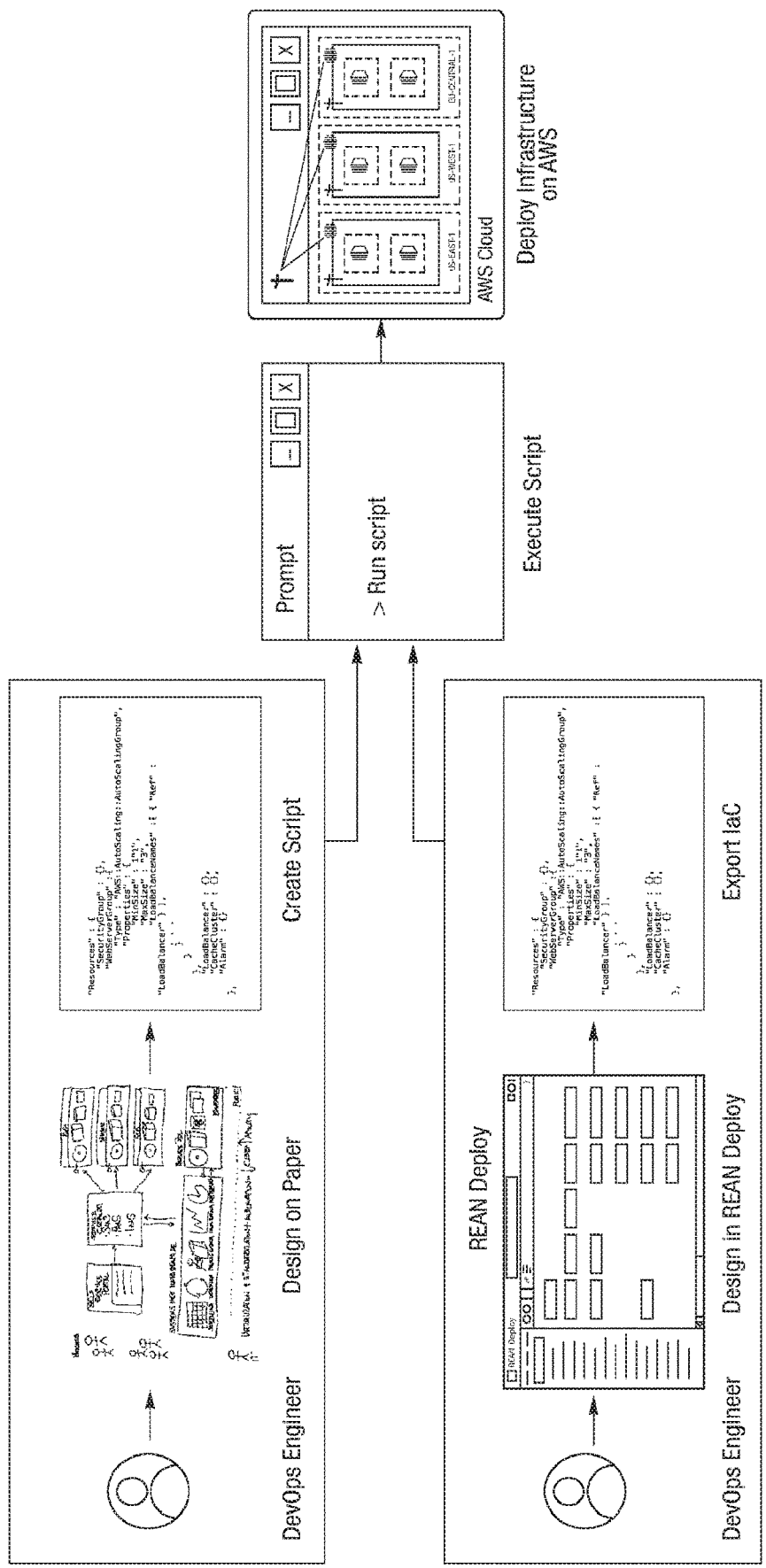
FIG. 1 shows a comparison of a manual design approach (top portion of figure) to an automated code generation approach (bottom portion of figure), according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, generating "infrastructure as code" or "IaC" generally means writing or otherwise generating code (e.g., using a high-level computer language or any descriptive language) to manage configurations and automate provisioning of infrastructure. Examples of the generated code include scripts (e.g., as described below). In some cases, generating IaC may further include automation of deployments. A non-limiting example of IaC that is generated is the following code which describes the creation of a server of the type "t2.micro".

```
resource "aws_launch_configuration" "example" {
    image_id = "ami-2d39803a"
    instance_type = "t2.micro"
}
```

Examples of an "infrastructure" include, but are not limited to, the following: Amazon Machine Image (AMI), Amazon Instances, Amazon Network Access Control List.

As used herein, a "blueprint" generally means a template that is used to replicate the creation of one or more environments which are used to design the infrastructure needed to deploy one or more various applications in the cloud. A blueprint is sometimes referred to herein as a "solution blueprint".

In various embodiments, a blueprint can be a logical group of infrastructure-as-code. The blueprint can contain multiple layers that depend on each other. For example, a database layer might depend on an infrastructure layer that consists of network elements. A solution blueprint is a logical blueprint that represents such a logical group of layers which have the components for each layer laid out so that they provide the end functionality directly. An example is one or more solution blueprints used for high availability of network firewalls (e.g., Palo Alto network firewalls), etc.

In some embodiments, blueprints may contain one or more environments that are connected or layered, and retain the dependencies between these environments. In this context, an environment is a single blueprint template, and a blueprint can contain multiple environments. A non-limiting example of a blueprint is a template that contains a virtual private cloud (VPC) which contains a server instance, both of which are represented by their respective GUI icons. In one example, the VPC is an AWS VPC.

As used herein, "deploying a cloud infrastructure" generally means installing a cloud resource and activating the cloud resource (e.g., activating by turning on the cloud resource). A non-limiting example of deploying a cloud infrastructure is the installation of a cloud-based server and then turning it on to prepare it for use.

Figure 24:
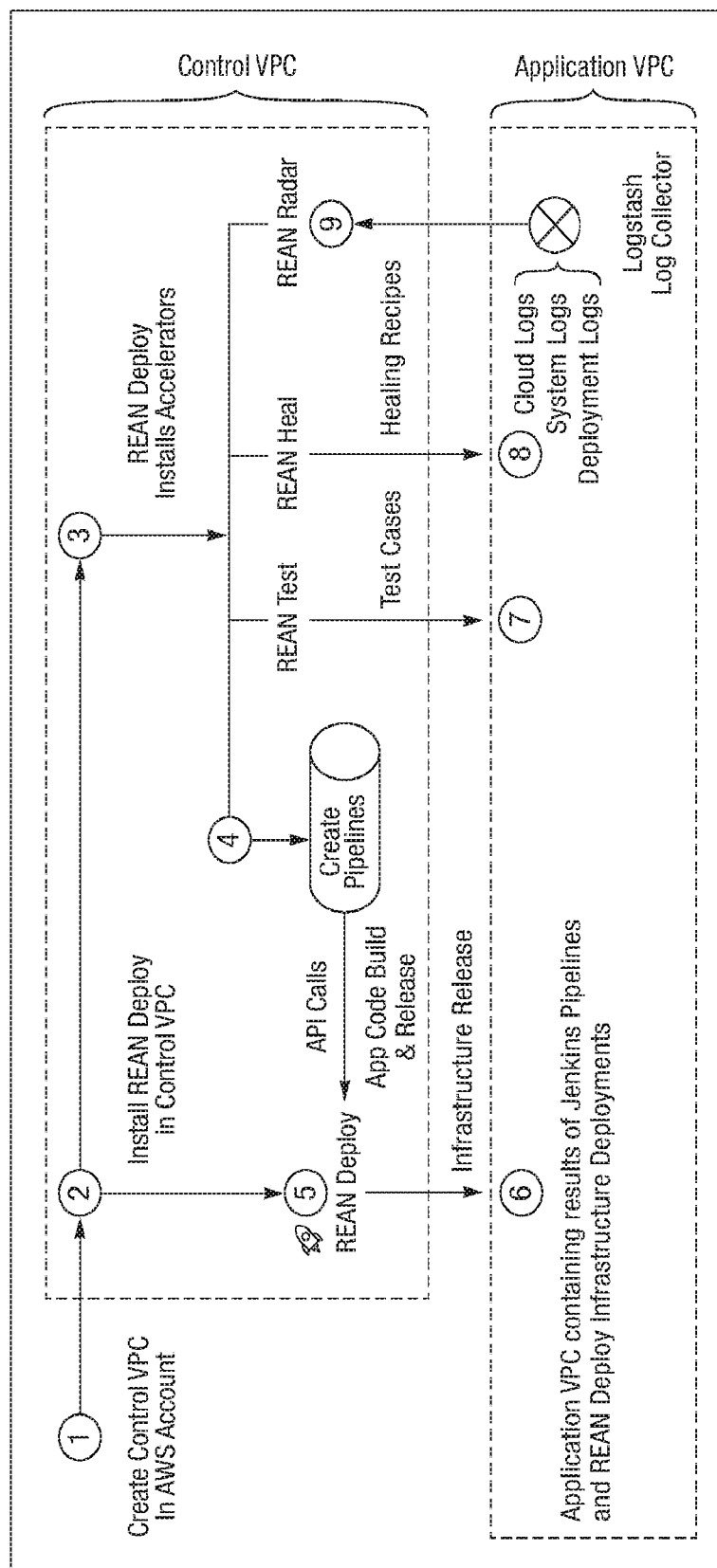
FIG. 24 shows an example of a cloud deployment flow chart with test automation according to one embodiment.

Merely for purposes of non-limiting illustration, an example of cloud deploy software is sometimes referred to herein as "REAN Deploy". For example, FIG. 24 illustrates a non-limiting example of cloud deploy software as REAN Deploy in step 5.

Merely for purposes of non-limiting illustration, an example of cloud test software is sometimes referred to herein as "REAN Test". For example, FIG. 24 illustrates a non-limiting example of cloud test software as REAN Test in step 3.

FIG. 1 shows a comparison of a manual design approach (illustrated in the top portion of FIG. 1) to an automated code generation approach (illustrated in the bottom portion of FIG. 1), according to one embodiment.

The prior approach for creating cloud-based infrastructure involves the manual creation or modification of scripts that are used for generating cloud-based infrastructure. This approach involves the manual design of the architecture on paper and then requires manual creation of scripts for each of the design components in order to generate the cloud infrastructure. The dependency on manual design and creation of scripts presents technical problems in that it is inherently error-prone and also requires a significant amount of time and manual resources.

Various embodiments of cloud deploy software as described herein overcome the above technical problems. The cloud deploy software avoids the need to manually create infrastructure as code by providing a novel process for generating cloud infrastructure. Typically, the process of building cloud infrastructure involves creation of a script that captures the sequence of application programming interface (API) methods that need to be executed (e.g., where the script is created using a command line tool). In one embodiment, the IaC is provided by these scripts, which consist of API methods used to build cloud infrastructure. In one embodiment, the cloud deploy software simplifies the creation and management of these deployment scripts by using a deployment blueprint, which is a set of user interface (UI) based icons which represent the underlying code needed to generate the cloud infrastructure. The cloud deploy software has a GUI driven interface that allows users to drag and drop cloud infrastructure icons along with software application icons to create a deployment blueprint that represents the code that can be executed within or outside of the cloud deploy software. Once a blueprint design is saved, the relevant IaC files can be automatically generated, for example in response to a click of a button or other user interface element by the user.

The prior approach of building cloud infrastructure using scripts also requires end users to understand the APIs of each cloud provider (e.g., Amazon, Microsoft, or Google). The learning curve involved in starting from scratch based on which cloud provider is selected adds complexity and delay to the process of deploying a design.

Similarly, there are multiple provisioning products (e.g., CHEF, Puppet and Ansible) that can be used to configure the software as IaC. The same learning curve exists for users who want to migrate from one provisioning software to another. The cloud deploy software overcomes these issues by allowing users to focus on the design of their infrastructure and software and automatically generates the underlying IaC. The cloud deploy software's ability to auto-generate both the provider and provisioner code prevents users from getting locked into one cloud provider or provisioner.

Cloud deploy software IaC code includes customizable parameters. This enables the same blueprint to be deployed into multiple environments such as development, test and production, without having to build separate blueprints for each deployment.

In some embodiments, the cloud deploy software uses a representational state transfer (REST)-based architecture. This is another significant advantage as contrasted to the prior approach because it enables the deployment process to be initiated from other automation tools. By using a REST-based API, other tools can initiate the deployment by making a remote call to the cloud deploy software. Without this capability, users previously were required to manually include the deployment script into the automation, which is harder to manage and prone to errors.

Cloud infrastructure created with cloud deploy software can be more secure than on-premise infrastructure due to cloud native security controls that allow users to restrict how cloud resources are accessed. In one embodiment, cloud deploy software makes detailed security configuration recommendations during cloud infrastructure creation. Cloud deploy software uses access keys (access key ID and secret access key) to manage cloud infrastructure access according to one embodiment. This is a more secure process than other methods that may require embedding account credentials (e.g., user names or passwords) in scripts.

The cloud deploy software approach to deploying cloud based infrastructure using a blueprint as described herein is novel because it allows for faster, consistent, and automation driven deployments irrespective of the cloud provider and the provisioning tool used to generate IaC. In one embodiment, cloud deploy software generates IaC code in the form of declarative configuration files (e.g., Terraform code). Pre-built blueprints also give users fast access to solutions that have already been optimized. For custom-built blueprints, the cloud deploy software may provide cost indications to help identify when a custom-built blueprint may be over-provisioned.

Figure 2:
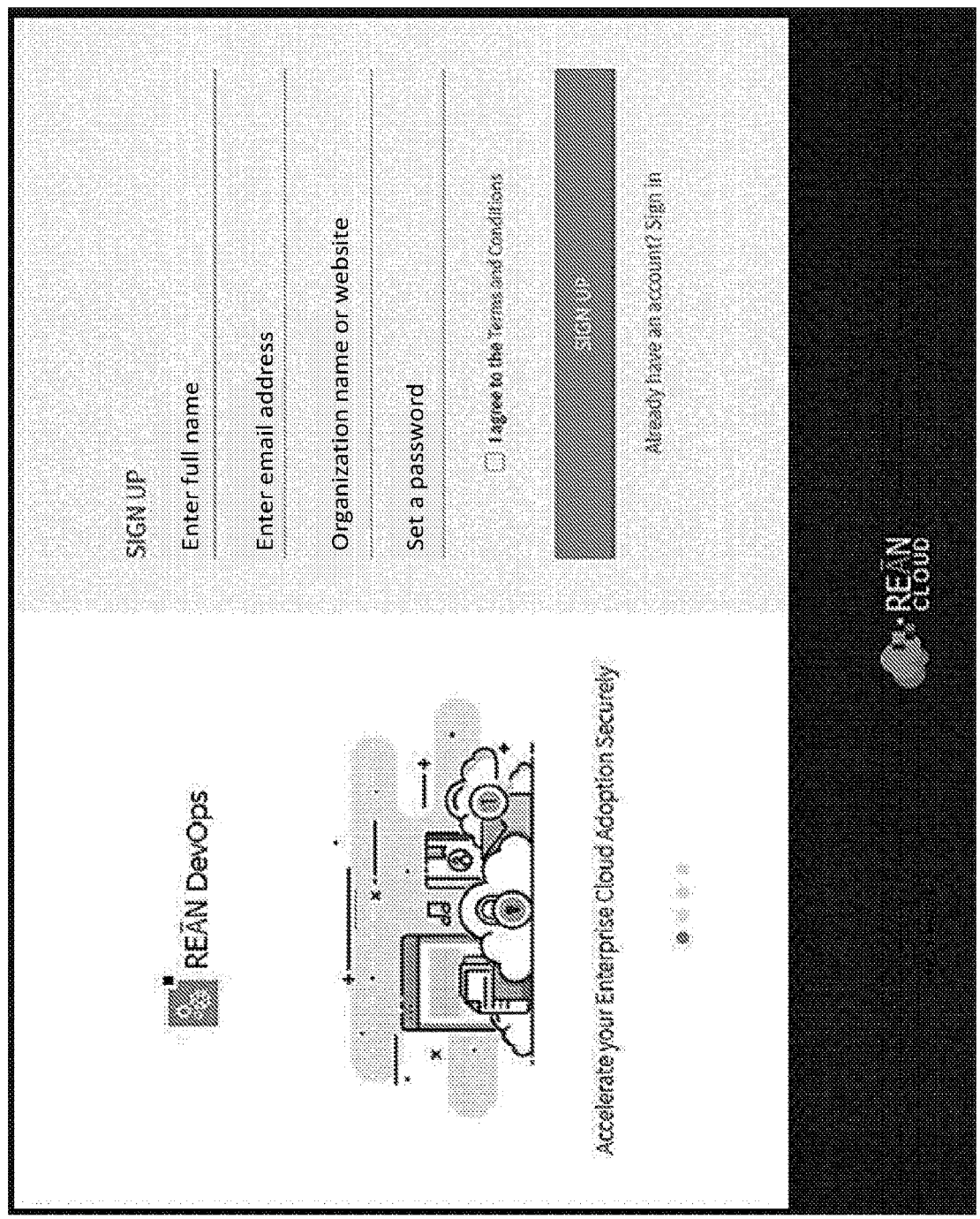
FIG. 2 shows a screenshot of a user interface of software (e.g., cloud deploy software) that permits a user to login to an online service according to one embodiment.

FIG. 2 illustrates a screenshot of a user interface of the software that permits the user to login to the service according to one embodiment. The user logs into the cloud deploy software using this login page.

Figure 25:
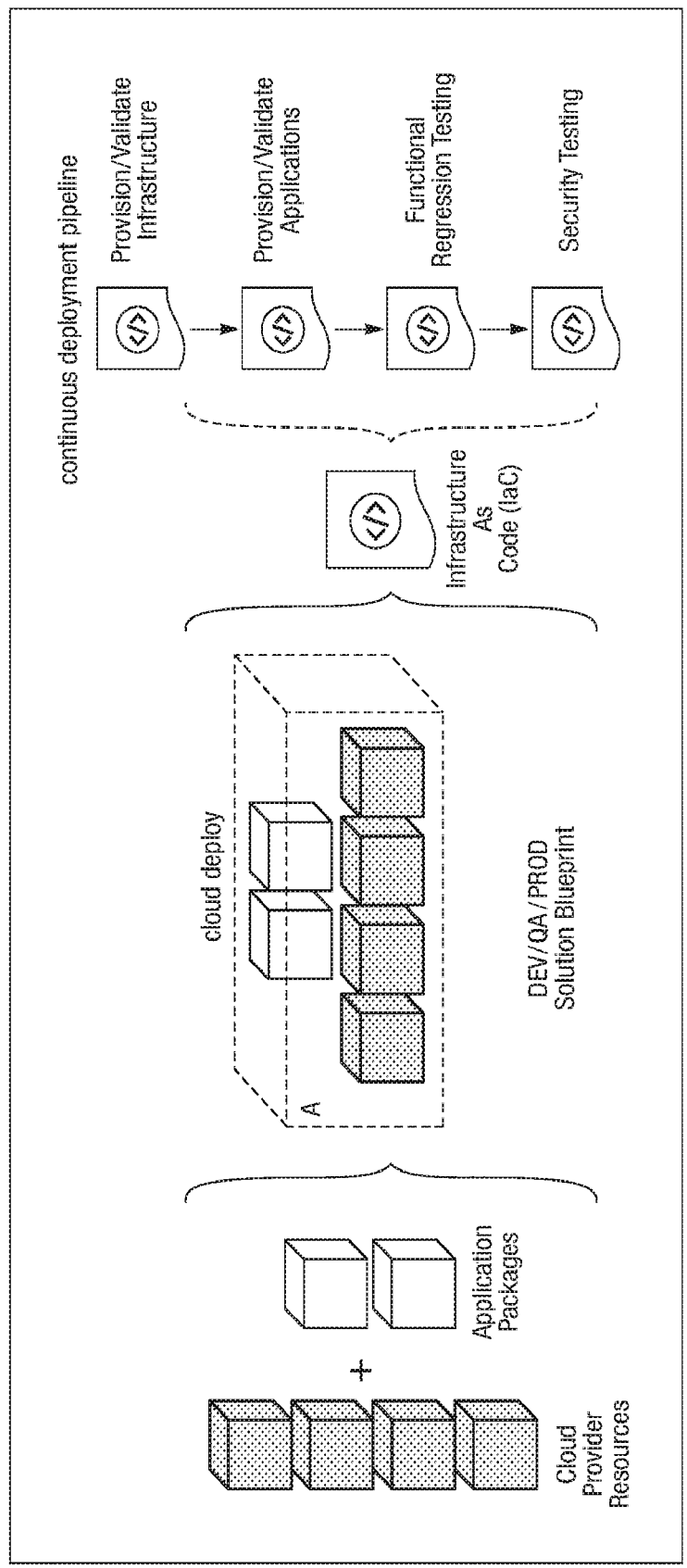
FIG. 25 shows a high-level view of a cloud deploy software implementation method according to one embodiment.

In one embodiment, the cloud deploy software is used to implement a method including the following steps. Step 1: Create a blueprint using a drag and drop interface on a user computing device. Step 2: Generate code based on the blueprint that is infrastructure as code and is generated by a server. Step 3: Deploy infrastructure to a cloud using the code. In one example, the deployed infrastructure includes a plurality of workloads. FIG. 25 shows a high-level view of this process according to one embodiment. In FIG. 25, cloud provider resource and application package blueprint components are selected and dropped into a solution blueprint depicted by block A. Blueprint components are configured as needed. IaC files are generated from the blueprint. The IaC files can be deployed to build the defined infrastructure in the cloud. A continuous deployment pipeline can be part of the deployment process. Details of these steps in the cloud deploy software process are further described in the embodiments below.

Figure 3:
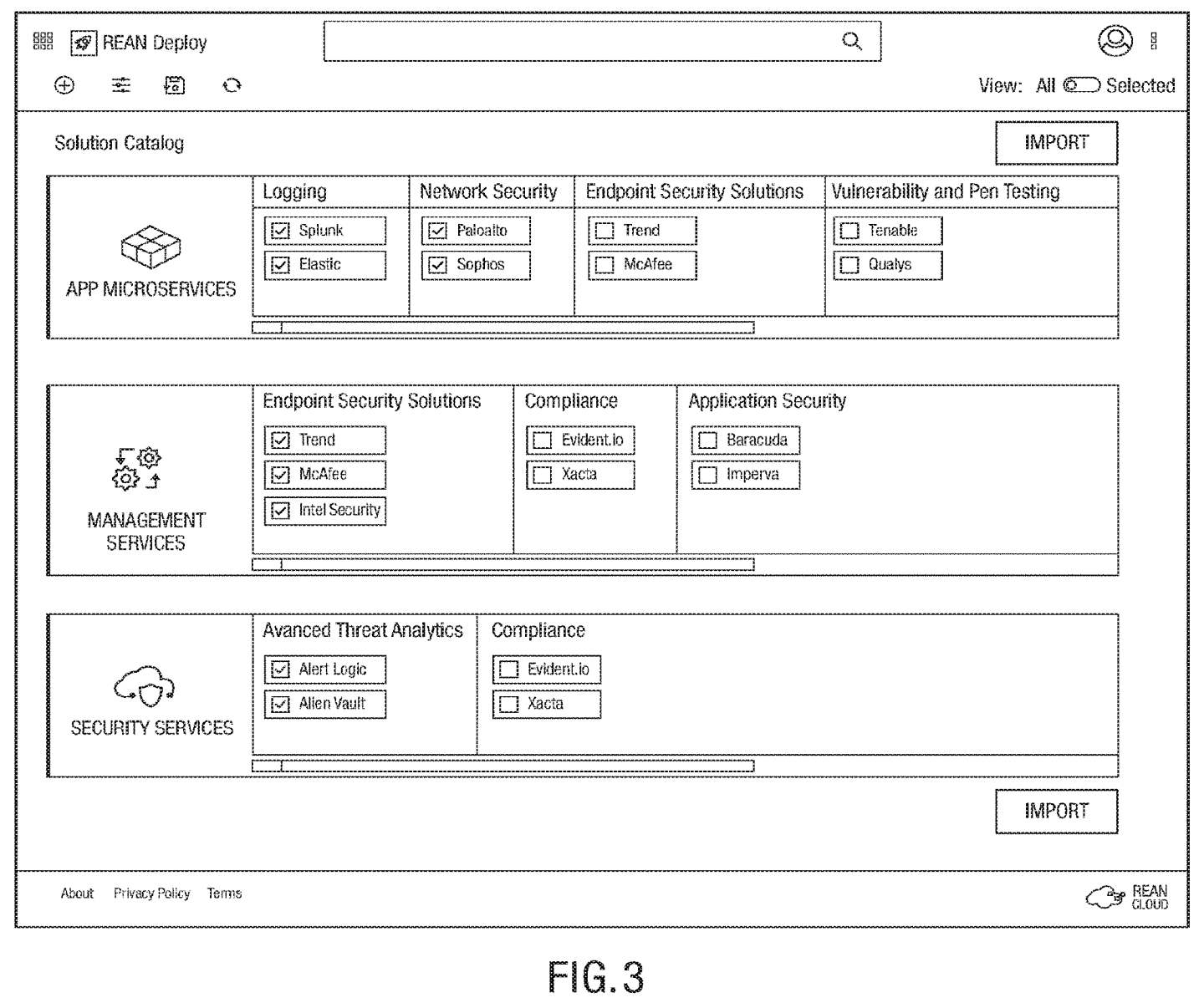

FIG. 3 shows the solution catalog according to one embodiment. Step 1.1: The user selects an item from the solution catalog. Users can select a pre-built blueprint or can build a custom blueprint. There are multiple functional components that are needed to build the equivalent of a traditional datacenter on the cloud. These functional components can be categorized into cloud provider resources (e.g., virtual machines and containers) and application packages (e.g., security applications such as firewall, key management, etc., and management application packages such as identity and access management, logging, etc.) that are provided by different software vendors. To begin designing an architecture, users need to determine which capabilities are required for this environment.

A cloud deploy software solution catalog lists the solution blueprints available for a particular software vendor. The cloud deploy software solution catalog includes all the pre-built solution blueprints, grouped according to the functionality they provide. An example of a pre-built solution blueprint is a solution blueprint for deploying a unified threat management (UTM) solution on a specific cloud provider (e.g., a Sophos UTM on AWS). Users can select solution blueprints from the solution catalog.

Cloud deploy software pre-built solution blueprints are designed based on a recommended architecture to deliver specific functionality. For example, a UTM pre-built solution blueprint could automatically create a high-availability architecture consisting of two servers configured as recommended by the cloud deploy software. All the infrastructure resources required to install this blueprint are already created within the pre-built blueprint. Alternatively, custom blueprints can be created by either modifying existing blueprints, or by starting from scratch and dragging and dropping required resources onto a canvas to create custom blueprints.

The cloud deploy software solution catalog can be further customized to create customer specific blueprints. In this context, custom customer blueprints include drag and drop software packages that the cloud deploy software creates with specific settings that the customer requests (via the user interface).

This approach of exposing blueprints for both software vendors and customer specific software-based application microservices allows users to start with pre-built blueprints that capture a majority (e.g., up to 90% in some cases) of the manual scripting required to spin up an application in the cloud.

This step in the process of generating infrastructure as code involves selecting out-of-the-box blueprints from the cloud deploy software solution catalog to generate infrastructure solutions that address, for example, app, security and cloud infrastructure management.

To select a solution blueprint from the solution catalog, a user can check the relevant solution icon and click Import. The import process renders the resources within the blueprints on the canvas by pulling the template metadata from a cloud deploy software database (e.g., a database on a remote computing device accessed over a network).

Each blueprint is designed to install a particular software vendor's solution. For example, a security blueprint might contain a template for installing a specific software vendor's firewall (e.g., a Sophos firewall). A management blueprint may be designed to install an antivirus solution from another software vendor (e.g., McAfee antivirus software). Each blueprint is different because it is specific to the software vendors supported.

Figure 4:
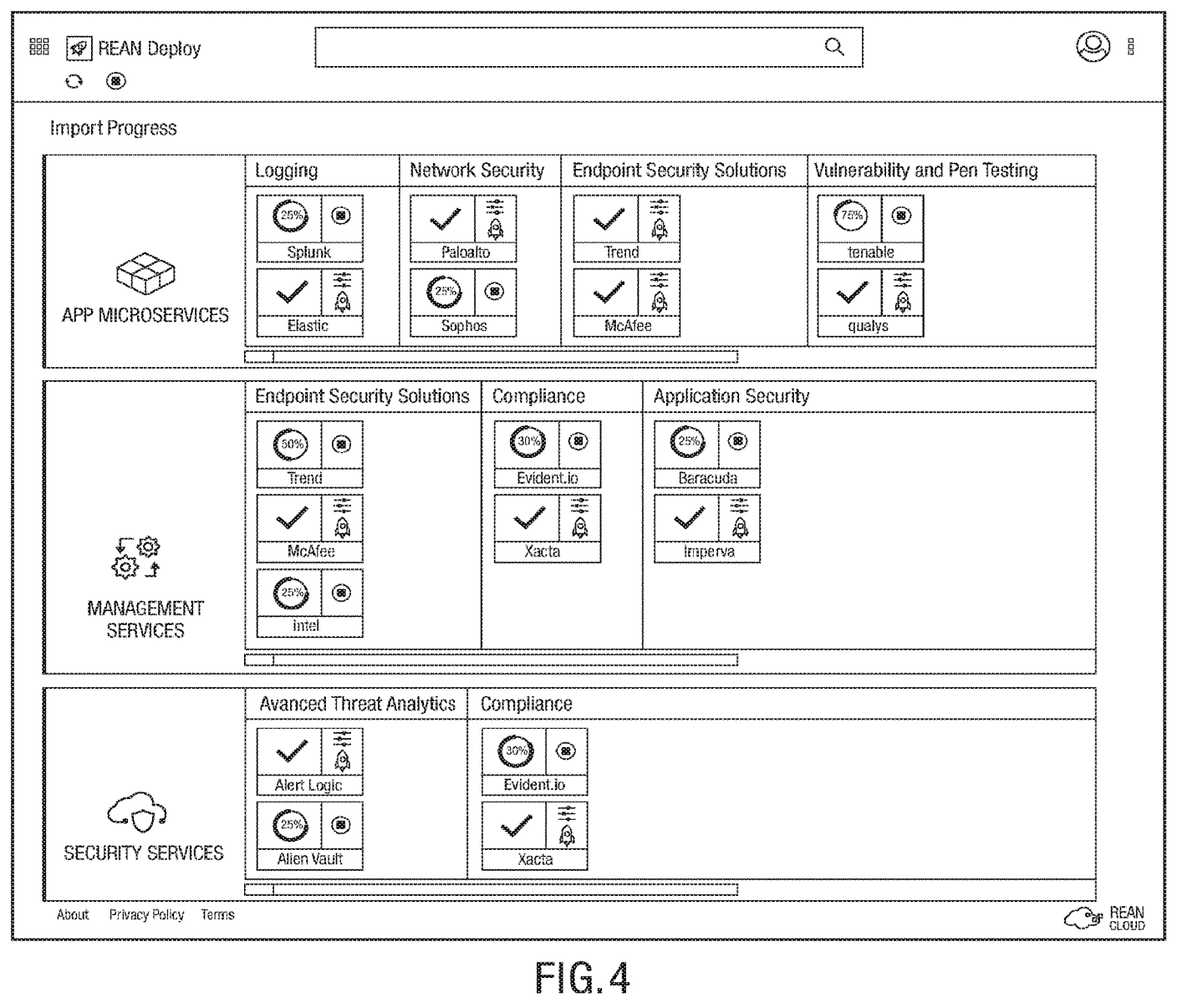

FIG. 4 shows a screenshot of an import progress screen as cloud deploy software renders the solution blueprint (sometimes referred to herein as a solution catalog blueprint) according to one embodiment. Step 1.2: Import solution blueprint. Some of the solution catalog items might consist of multiple cloud deploy software blueprints. The next step in the process is importing the solution blueprints to prepare them for deployment. This involves gathering all the underlying blueprint components (e.g., cloud provider resources and application packages) that comprise each selected blueprint.

In one example, one of more of the solution blueprints are imported by receiving each solution blueprint from a different computing device. For example, one blueprint may be received over a network from a first server, and a second blueprint may be received over a network from a second server.

The import progress screen has a dial associated with each blueprint that shows the status of the imported solutions according to one embodiment. This dial visually indicates the progress in gathering blueprint components that represent the infrastructure resources and packages within the blueprint.

Once the import completes, the user has the option to modify/configure the blueprint or deploy from the blueprint using default settings. In one typical use case for modifying a blueprint, a user configures the names, versions, size or other attributes of the cloud resources within the blueprint.

Users can select the modify button on the import icon to modify and configure blueprint components according to one embodiment. The modify button opens the blueprints associated with the solution catalog in a canvas for further configuration. The cloud deploy software canvas is the main area of the user interface where the components of the blueprints are displayed.

The canvas also has additional capabilities to import or copy non-catalog blueprints to build custom solutions.

Figure 5:
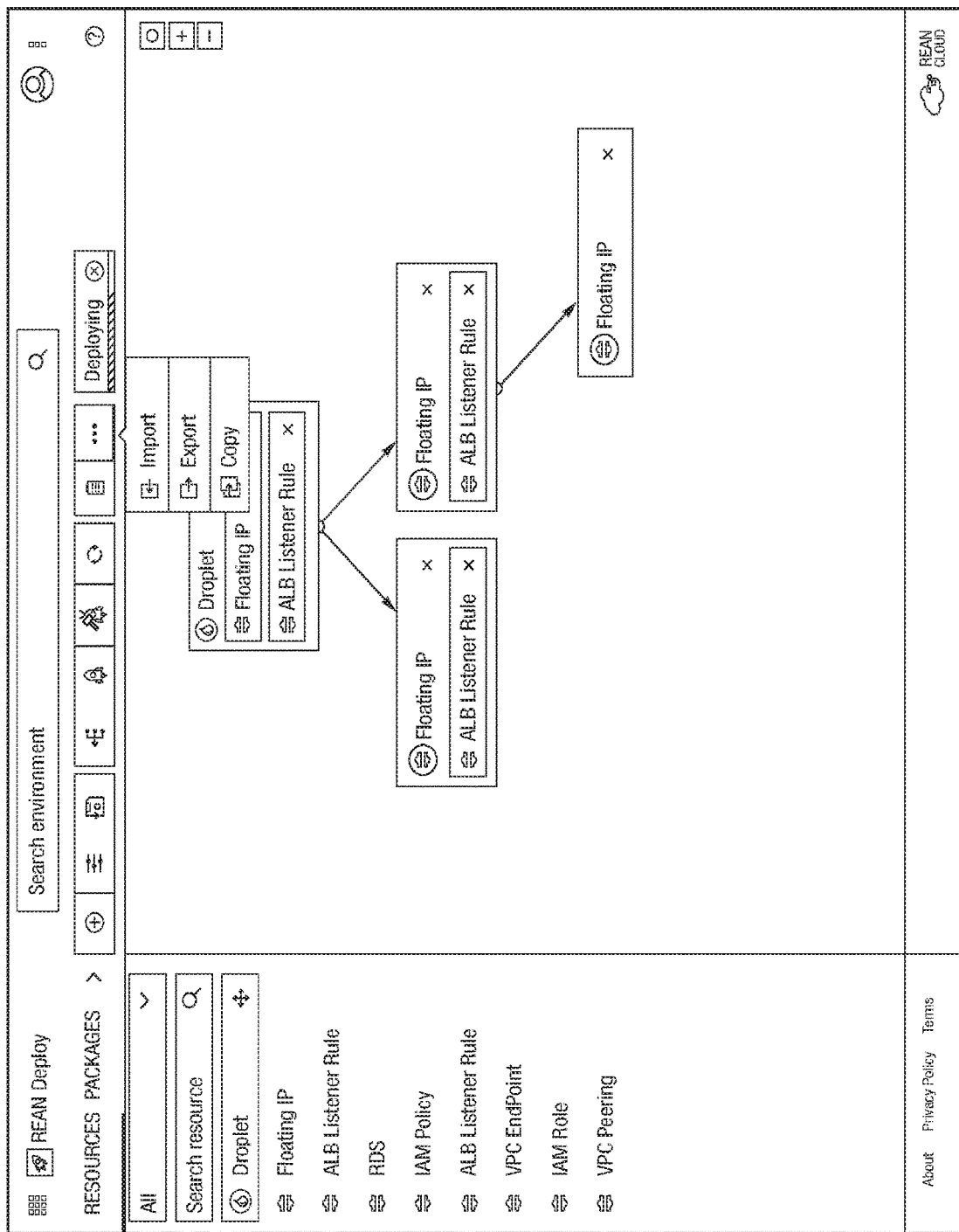
FIG. 5 shows canvas and cloud deploy software resources according to one embodiment.

FIG. 5 shows the canvas and cloud deploy software resources according to one embodiment. Step 1.3: Modify the solution blueprint. If the modify button next to the imported solution catalog item is clicked, the blueprints associated with that item are opened in a canvas for further configuration. The cloud deploy software canvas is the main area of the user interface where the components of a blueprint are displayed.

FIG. 5 shows a screenshot of a canvas containing blueprint components and a list of available resources according to one embodiment. In this example, the Droplet and Floating IP blueprint components represent the cloud resources that have been dragged and dropped from the resources section into the canvas. These are graphical representations of cloud resources that will be installed on the cloud when the user deploys the solution, for example, by clicking on an icon (e.g., a rocket icon as illustrated in FIG. 5).

Figure 6:
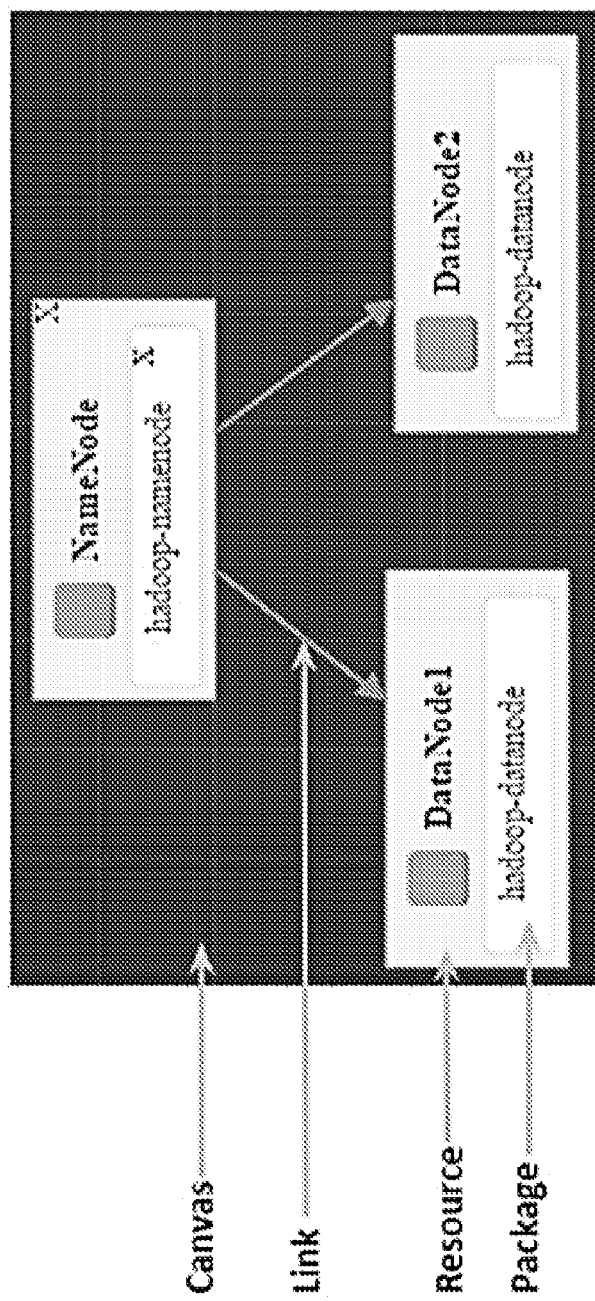
FIG. 6 shows different elements that are a part of a blueprint according to one embodiment.

FIG. 6 shows the different elements that are a part of a blueprint according to one embodiment. Within the cloud deploy software canvas, there are three main categories of blueprint components: resources, packages and links (blueprint components are also referred to herein as code artifacts). These are described in more detail below.

Resources: Entities that require instantiation in the infrastructure, such as a VPC instance, internet gateway, virtual private network connection, or security group.

Packages: Automation scripts that enable a user to provision resources in a blueprint. The cloud deploy software can provide multiple default (i.e., out-of-the-box) packages, such as big data, web server and shopping cart solutions from software vendors (e.g., hadoop, chef-nginx, and magento). If required, a user can also create user-defined packages by using third party configuration management and automation tools, for example, Chef, Ansible, Puppet, or Chef Server.

Figure 7:
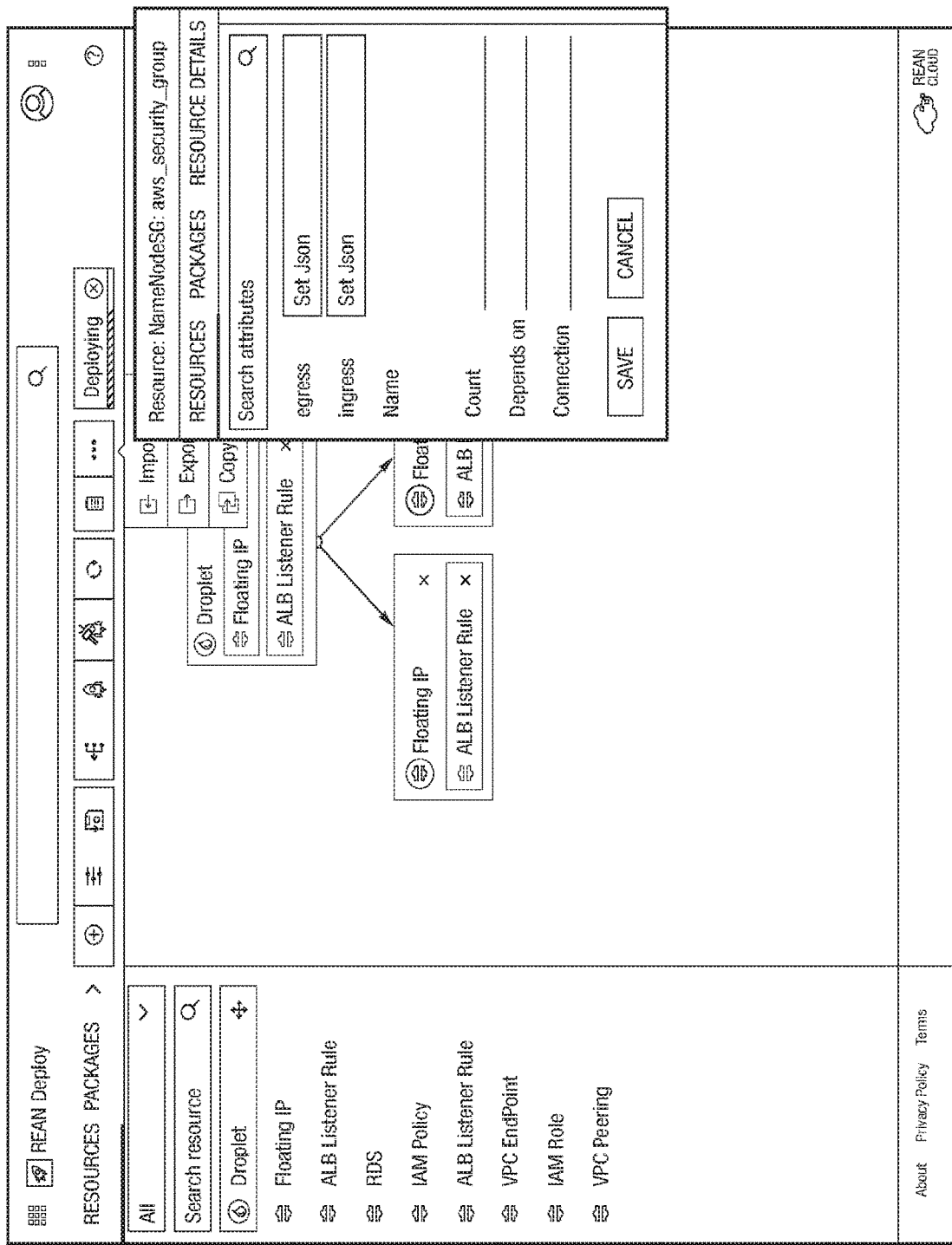
FIG. 7 shows a configuration panel according to one embodiment.

Links: Visual representations of dependencies between various resources in an environment. For example, a dependency may be a parent-child relationship where the child resource can only be installed if the parent resources exist. In one embodiment, links are created when a resource uses the "Depends On" attribute to reference another resource. FIG. 7 shows the "Depends On" attribute in the right panel under "Resources".

Optionally, if a user (e.g., a customer) has enabled a migration accelerator (e.g., cloud migrate software) and migrated servers to cloud deploy software, the user can also add virtual appliance images of the migrated servers (e.g., Amazon machine images (AMI)) to a blueprint. A panel (e.g., a left panel) on a home page of cloud deploy software user interface displays an additional images tab, which contains the virtual appliance images that are generated for the migrated servers.

The canvas supports drag and drop functionality to add blueprint components such as cloud provider resources, application packages or virtual machine images (e.g., AMI) to a blueprint.

FIG. 7 shows the configuration panel according to one embodiment. Step 1.4: Configure blueprint components. Once blueprint components, also known as code artifacts, are in the canvas, right clicking on the instance exposes the configuration panel for that component.

Common configuration choices include software versions, and resource settings such as sizes, names, etc. For example, the size of a virtual private cloud instance might be modified from medium to large (e.g., an AMI may be modified from a m4.medium to a m4.large) to support the expected load on the application. Once the blueprint configuration is complete and saved, it is ready for code generation.

Figure 8:
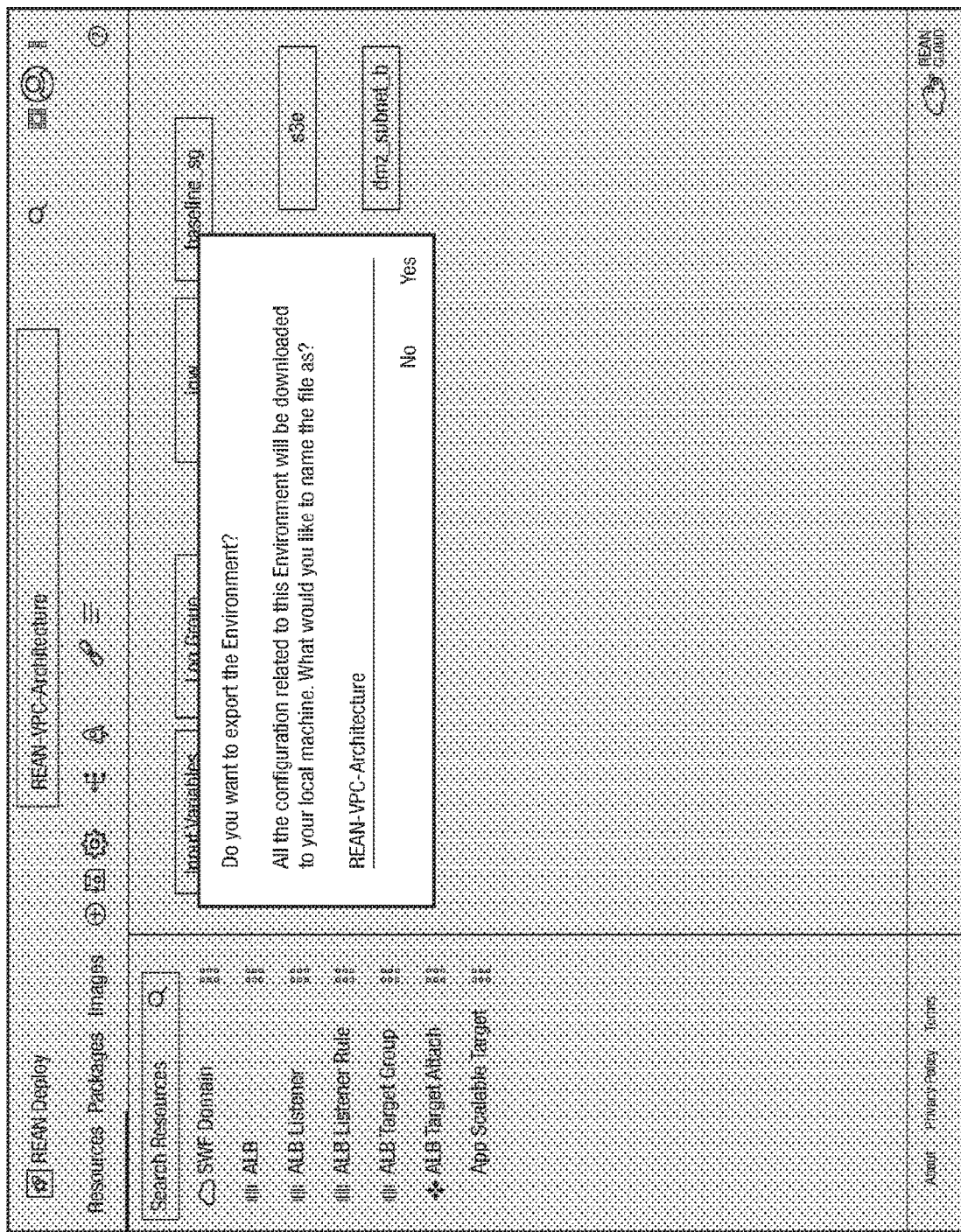
FIG. 8 shows export of a blueprint and its environments, according to one embodiment.

FIG. 8 shows export of a blueprint and its environments, according to one embodiment. Step 2: Generate infrastructure as code. Cloud deploy software supports the option of deploying (e.g., executing scripts in the IaC files created for a blueprint against the cloud provider to create the infrastructure) or exporting a blueprint. In one embodiment, an action, such as clicking on an export button and entering a name for the generated file, will export infrastructure as code (e.g., IaC) for a blueprint. In one embodiment, one or more IaC files are created on the user computing device. In another embodiment, IaC files are created on a server. In one embodiment, an action such as clicking a deploy button, will generate the IaC code and create the infrastructure defined in the blueprint in the cloud.

Step 3: Deploy infrastructure to a cloud. When an action, such as clicking a deploy button (e.g., a button with a rocket icon) occurs, cloud deploy software initiates the creation, in the cloud, of the cloud resources defined in the IaC files. Cloud deploy software initiates the command to make an API call to a cloud provider (e.g., AWS). It then processes the IaC (e.g., by executing scripts generated from a blueprint as described above) to install and turn on the different resources. For example, when a user deploys a blueprint that contains a cloud service provider (e.g., AWS) instance, cloud deploy software makes the API call to that cloud service provider and creates a server instance and turns it on to make it ready for use. The user can then log into the server and use it as required.

The methods described above regarding using cloud deploy software to implement creating a blueprint using a drag and drop interface and generating code can be implemented in the processes shown in FIG. 5 and FIG. 24, according to one embodiment. FIG. 5 shows a user creating a blueprint using a drag and drop interface. FIG. 24 shows several intermediate steps for a server to generate infrastructure as code based on the blueprint and deploying the infrastructure to a cloud using the code.

More specifically, in FIG. 24, step 1 shows a control VPC server is instantiated on a cloud service provider. The control VPC orchestrates and manages the cloud deployment process. In step 2, the cloud deploy software is installed on the control VPC. The control VPC hosts all accelerator resources and acts as a control plane for executing the deployment of all accelerators and pipeline instances. In step 3, cloud deploy software installs accelerator and pipeline instances including cloud test software. In one embodiment, pipelines are created on the control VPC. In another embodiment, pipelines are located on one or more remote computing devices and are accessed with remote calls. In step 4, pipelines execute and send API calls to cloud deploy software. In step 5, cloud deploy software has IaC files ready to deploy. In one embodiment, cloud deploy software generates or modifies IaC files in response to pipeline API calls. In another embodiment, IaC files are not modified by pipeline API calls. In step 6 cloud deploy software instantiates the application VPC and application code. Step 7 shows cloud test software running tests on the newly instantiated cloud infrastructure (e.g., this can include running infrastructure tests to confirm the cloud infrastructure created meets blueprint requirements). Steps 8 and 9 show other accelerators that may be installed (e.g., cloud health monitoring or repair accelerators).

Figure 9:
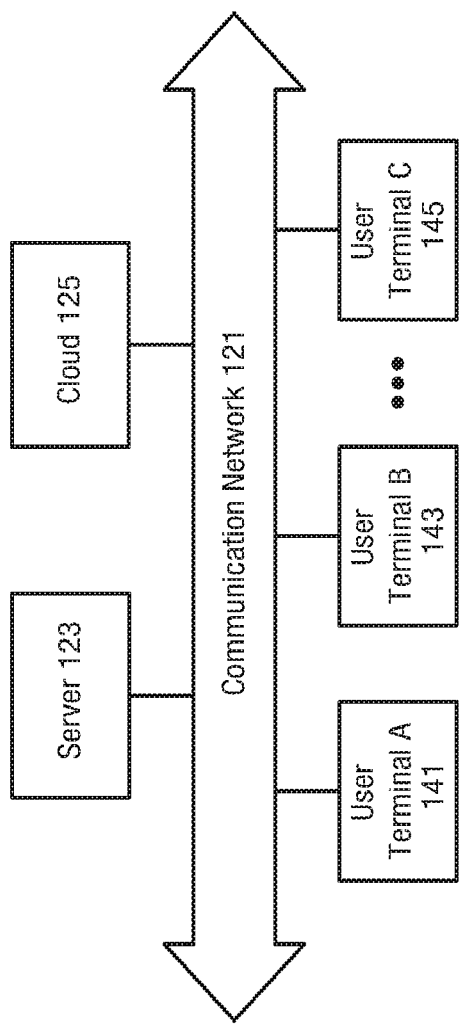
FIG. 9 shows a system to generate IaC based on a blueprint, according to one embodiment. The system of FIG. 9 can also be used to generate testing infrastructure used to test an application (e.g., an application deployed based on the blueprint).

FIG. 9 shows a system to generate IaC based on a blueprint, according to one embodiment. In FIG. 9, the user terminals (e.g., 141, 143, . . . , 145) are used to access a server 123 over a communication network 121.

The server 123 may include one or more web servers (or other types of data communication servers) to communicate with the user terminals (e.g., 141, 143, . . . , 145). In FIG. 9, the users may use the terminals (e.g., 141, 143, . . . , 145) to interact with a user interface to create and modify blueprints as discussed above.

Although FIG. 9 illustrates an example system implemented in client server architecture, embodiments of the disclosure can be implemented in various alternative architectures. For example, the server can be implemented via a peer to peer network of user terminals.

In some embodiments, a combination of client server architecture and peer to peer architecture can be used, in which one or more centralized servers may be used to provide some of the information and/or services and the peer to peer network is used to provide other information and/or services. Thus, embodiments of the disclosure are not limited to a particular architecture.

FIG. 10 shows a block diagram of a data processing system which can be used in various embodiments (e.g., as server 123 of FIG. 9). While FIG. 10 illustrates various components of a computer system, it is not intended to represent any particular architecture or manner of interconnecting the components. Other systems that have fewer or more components may also be used.

In FIG. 10, the system 201 includes an inter-connect 202 (e.g., bus and system core logic), which interconnects a microprocessor(s) 203 and memory 208. The microprocessor 203 is coupled to cache memory 204 in the example of FIG. 10.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment, the I/O controller 206 includes a Universal Serial Bus (USB) adapter for controlling USB peripherals, and/or an Institute of Electrical and Electronics Engineers (IEEE) IEEE-1394 bus adapter for controlling IEEE-1394 peripherals.

The memory 208 may include Read Only Memory (ROM), and volatile Random Access Memory (RAM) and non-volatile memory, such as hard drive, flash memory, etc.

Volatile RAM is typically implemented as dynamic RAM (DRAM) which requires power continually to refresh or maintain the data in the memory. Non-volatile memory is typically a magnetic hard drive, a magnetic optical drive, or an optical drive (e.g., a Digital Versatile Disk (DVD) RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 10 is used to implement a user terminal. A user terminal may be in the form of a mobile device, a notebook computer, or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

FIG. 11 shows a block diagram of a user device according to one embodiment (e.g., a user computing device for creating a blueprint). In FIG. 11, the user device includes an inter-connect 221 connecting the presentation device 229, user input device 231, a processor 233, a memory 227, a position identification unit 225 and a communication device 223.

In FIG. 11, the communication device 223 is configured to communicate with a server to provide data for a blueprint. The user input device 231 may include a text input device, a still image camera, a video camera, and/or a sound recorder, etc.

Variations of Cloud Deploy Software

Various additional embodiments for cloud deploy software are now described below. In one embodiment, drag-and-drop infrastructure resources and application packages are used to modify blueprints. For example, cloud deploy software is used as a deployment automation platform to deploy and configure complex environments reliably and consistently using drag and drop capabilities. It consists of a visual GUI to generate infrastructure as code to deploy application stacks to any cloud provider. The user starts by selecting the required blueprint in cloud deploy software and the related resources and packages are displayed on the canvas. The canvas is also known as the workbench.

The user can further create or modify the environment blueprint by dragging and dropping infrastructure resources into the canvas to modify the existing blueprint. This is followed by the drag and drop of specific software application packages that need to be provisioned on top of the infrastructure resource.

The user then chooses to save or deploy the modified blueprint.

The deployment of the blueprint generates IaC that captures the infrastructure as well as application software provisioning steps. This approach allows cloud deploy software to generate IaC that is both cloud provider (e.g., AWS/Azure/Docker) and software provisioner (e.g., Chef/Puppet/Ansible) agnostic.

Cloud Test Software

As mentioned above, in various additional embodiments, cloud test software can be provided. In some embodiments, the cloud test software can be used in conjunction with the cloud deploy software above. The computing systems illustrated in FIGS. 9-11 above can be used to implement the cloud test software in various embodiments. For example, a user interface with test results can be presented to a user of user terminal 141, 143, and/or 145. The user can also enter selections of browsers, and other testing configuration parameters as discussed below. The cloud test software can run on server 123 and/or user terminal 141, 143, and/or 145. The testing infrastructure can be generated (e.g., by instantiating one or more servers) in the cloud 125.

As mentioned above, the cloud test software is a cloud-based test automation accelerator. It identifies cloud infrastructure needed for testing and dynamically creates the test infrastructure just-in-time for test execution. Cloud test software can perform rapid, parallel, cross-browser functional, performance, scale and security testing. It can test created cloud infrastructure to verify it meets blueprint requirements. Cloud test software can also integrate plug-ins to perform functions such as test automation with third party test applications and continuous testing after each build. Tests can be scheduled with cloud test software to start at specific times and to repeat for synchronous or asynchronous testing. To reduce testing cost, cloud test software can automatically release test infrastructure when testing is complete.

Prior approaches to performing parallel and cross-browser cloud testing involved manually creating cloud based infrastructure, installing browser and cloud test software on each instance and repeating tests for each browser version with as many client instances as required for load testing. Cloud test software accelerates testing by automating test infrastructure creation, browser and test software installation, and running tests. It is novel in its ability to automatically create test infrastructure, automate running tests in parallel using multiple browsers and browser versions, schedule synchronous and asynchronous test cycles, initiate security scans using third party software and aggregate parallel test results. This test automation can speed up problem identification and resolution and help developers get cloud applications up and running faster.

In one embodiment, when cloud deploy software is installed on a virtual private cloud, the cloud deploy software includes software code to load and start other accelerators including cloud test software. Once the cloud deploy software installation is complete and an application VPC has been created and configured, cloud test software can be configured to run automatically to test the newly created cloud infrastructure and application. FIG. 24 shows an example cloud deployment flow chart with test automation according to one embodiment.

Various additional functionality related to testing is described below. Various functions of a cloud test software accelerator, also referred to more generally as cloud test software, are described in several embodiments below. In one embodiment, these testing functions can be implemented on server 123 of FIG. 9. In various embodiments, these testing functions can be used in conjunction with cloud deploy software, or can be used separately from cloud deploy software.

In one non-limiting example, the testing below is generally used with cloud deploy software to validate the deployed cloud infrastructure that was created.

In one embodiment, the cloud test software allows users to take advantage of an out-of-the-box DevOps centric test automation platform. It automatically creates dynamic testing infrastructure on a cloud provider (e.g., AWS) as needed when tests are run. This infrastructure comprises both cloud infrastructure and specific testing software (e.g., selected browsers and browser versions, and test automation tools such as Selenium or TestComplete) needed to run testing. It then uses the created infrastructure and installed software to automatically run selected testing, for example, rapid, parallel and cross-browser functional, performance, load and scale testing. Cloud test software, as a continuous testing tool, provides users (e.g., customers) the ability to test web applications using multiple browser types and versions, runs specific tests (URL, functional or manual) and provides state-of-the-art test result data analytics. This accelerates testing by providing a turnkey framework with testing pipelines that can run without human intervention.

The cloud test software implements a novel test process which includes automatically generating all necessary application testing cloud infrastructure as required. Unlike other testing tools which simulate users accessing the applications, cloud test software generates real traffic from real servers that are installed on the cloud. In one embodiment, the servers are installed on cloud 125 of FIG. 9. This approach allows users to save time by automatically creating infrastructure, running the tests, aggregating the results and then deleting the testing infrastructure.

In one embodiment, the testing infrastructure is automatically generated to validate that the cloud infrastructure created by cloud deploy software has been generated in accordance with the configurations and resources defined in the blueprint. Testing infrastructure in this context refers to the cloud-based servers on which the testing scripts are executed to gather results for validating the blueprints.

By only creating infrastructure for the duration of the test, the approach can save customers from paying for infrastructure that is not being utilized (e.g., computing resource requirements are reduced). Additionally, cloud test software lets users (e.g., a user of a user terminal 141, 143, or 145) execute tests on-demand or schedule the tests to run at a specific time. Cloud test software enables automating many cloud system tests, including, but not limited to, the tests listed below:

1—URL test
2—Manual test
3—Security test
4—UI performance analysis test
5—Automated cross browser test
6—Scale test
7—Infrastructure test
8—Scheduled test
9—Security scans test Prior Approach The prior approach to perform parallel and cross-browser functional, performance, load and scale testing involved the execution of the following steps manually:

1. Manually create cloud based infrastructure
2. Install the browser software individually on every instance.
3. Install the test software client on every instance.
4. Log in to each individual instance to configure the test parameters.
5. Execute the test
6. Wait for the test to complete.
7. View the test results
8. Repeat the steps 1-7 for every version of the browser.
9. Repeat the steps 1-7 to create as many instances of users as required to test load performance.

Cloud Test Software Approach

Testing is one of the main areas that can be automated to accelerate application deployment. Testing is part of an application release cycle that may identify one or more possible problems. Automated testing may provide more immediate feedback to developers so that issues get fixed more quickly.

As described above, prior approaches to testing required users to manually set up the infrastructure, install the browser software, and run the tests. The cloud test software approach automates testing infrastructure creation, browser software installation, and test execution. Additionally, cloud test software has some novel capabilities that do not exist in prior approaches. These novel features are listed below:
1. The ability to integrate with automation software to drive tests on external platforms.
2. The ability to run tests in parallel using multiple servers.
3. The ability to run tests in parallel using multiple browser versions.
4. The ability to schedule tests to run a specific time.
5. The ability to initiate security scans using third party software.
6. The ability to aggregate results from parallel tests.

Cloud test software also has a scale test feature which helps users perform continuous scale testing. Using scale testing, users can more readily perform sophisticated tasks like break-point analysis.

Various embodiments of cloud test software components are now described below.

Cloud Test Software Login

Figure 13:
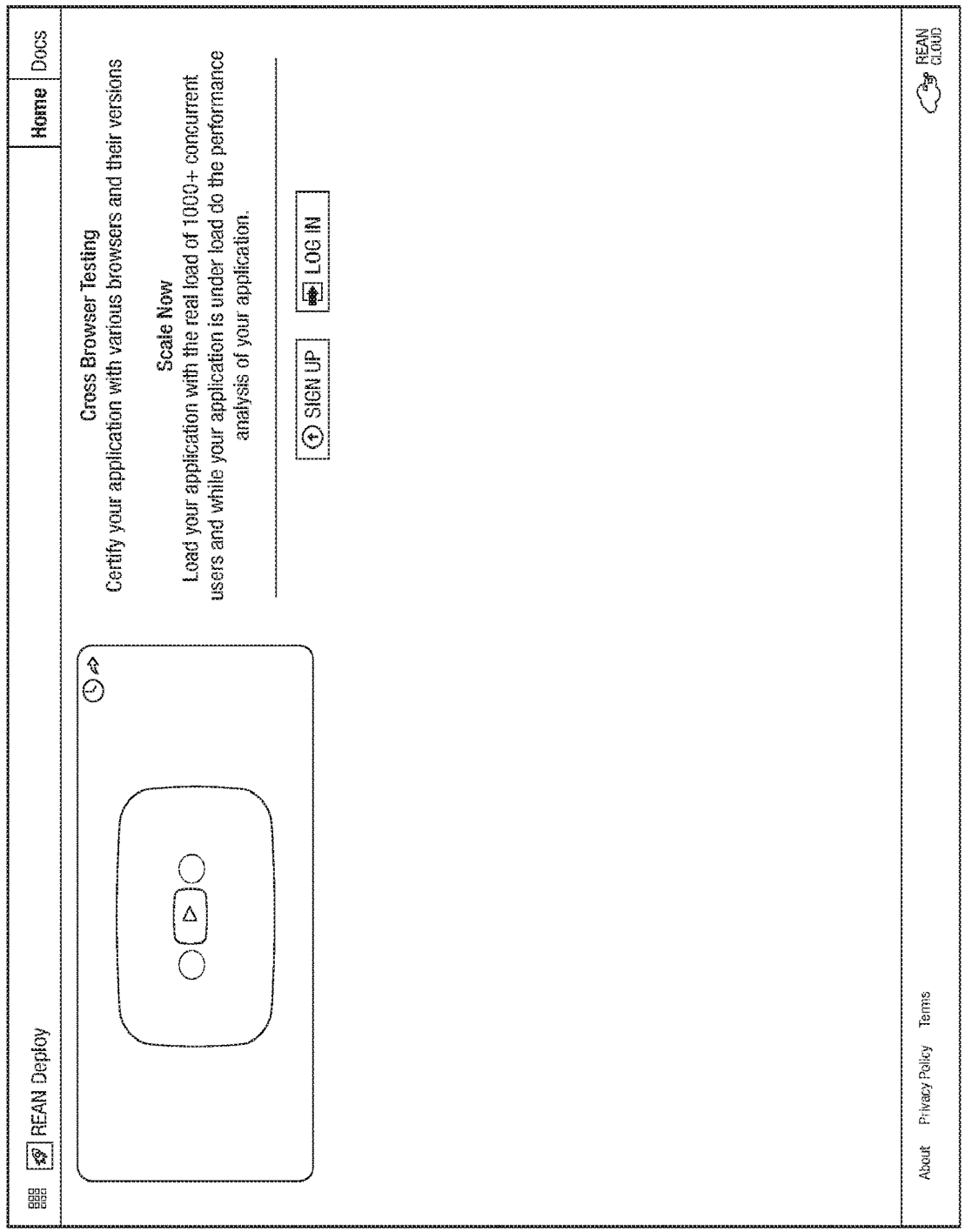
FIG. 13 shows a cloud test software user login according to one embodiment.

To access the different types of tests and test analytics supported by cloud test software, users log into cloud test software. FIG. 13 shows a screenshot of an example user sign-up and login screen according to one embodiment.

Dashboard

Figure 12:
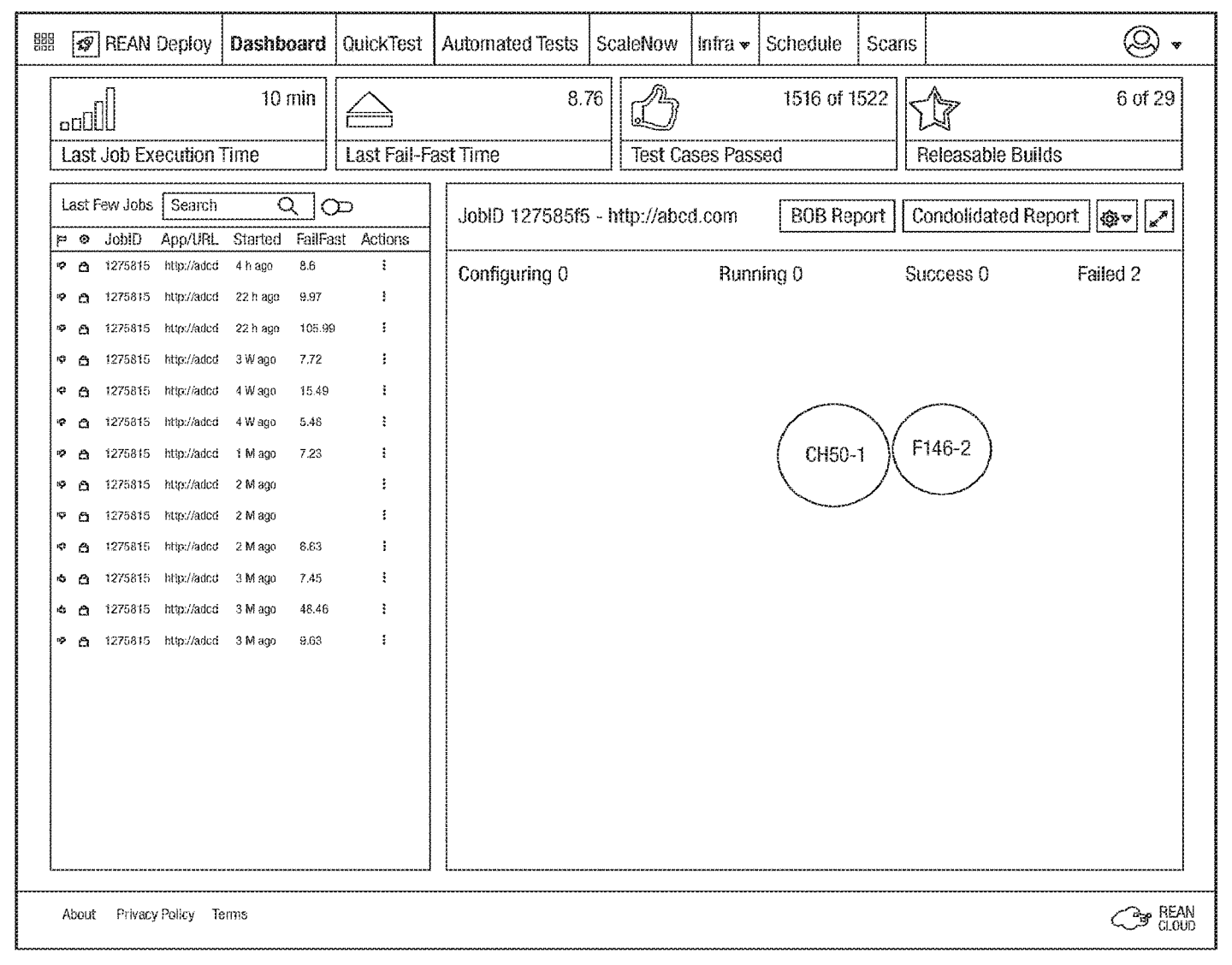

FIG. 12 shows an example dashboard image according to one embodiment. In one embodiment, after user login, a dashboard is the home page of cloud test software. The dashboard enables users to select tests to run, shows test runs in progress and gives detailed test run results. Test details such as last job execution time, last fail-fast time, test cases passed and releasable builds are also shown on the dashboard. Test-in-progress and completed test details are visible in the dashboard in the form of bubbles. Browser, status, and other criteria-based analytic aggregations are built into the dashboard visualization. Each browser is depicted by, for example, one bubble (e.g., as illustrated in FIG. 12) on the dashboard. The size of the bubble is proportional the time taken for the test to complete and the color represents the test status. In other embodiments, other forms or types of shapes or grahpical objects or images that vary in size or color can be used to indicate the foregoing. Details of tests running on the virtual machine instance (e.g., a server instantiated in an AWS cloud) are visible by clicking on the browser bubbles when the browser bubbles show the state as running. For tests that have completed, clicking the browser bubbles shows completed test results. Details of a job can be viewed by switching to the jobs view screen and selecting a job from a list of the last few jobs.

Test Selection

Figure 14:
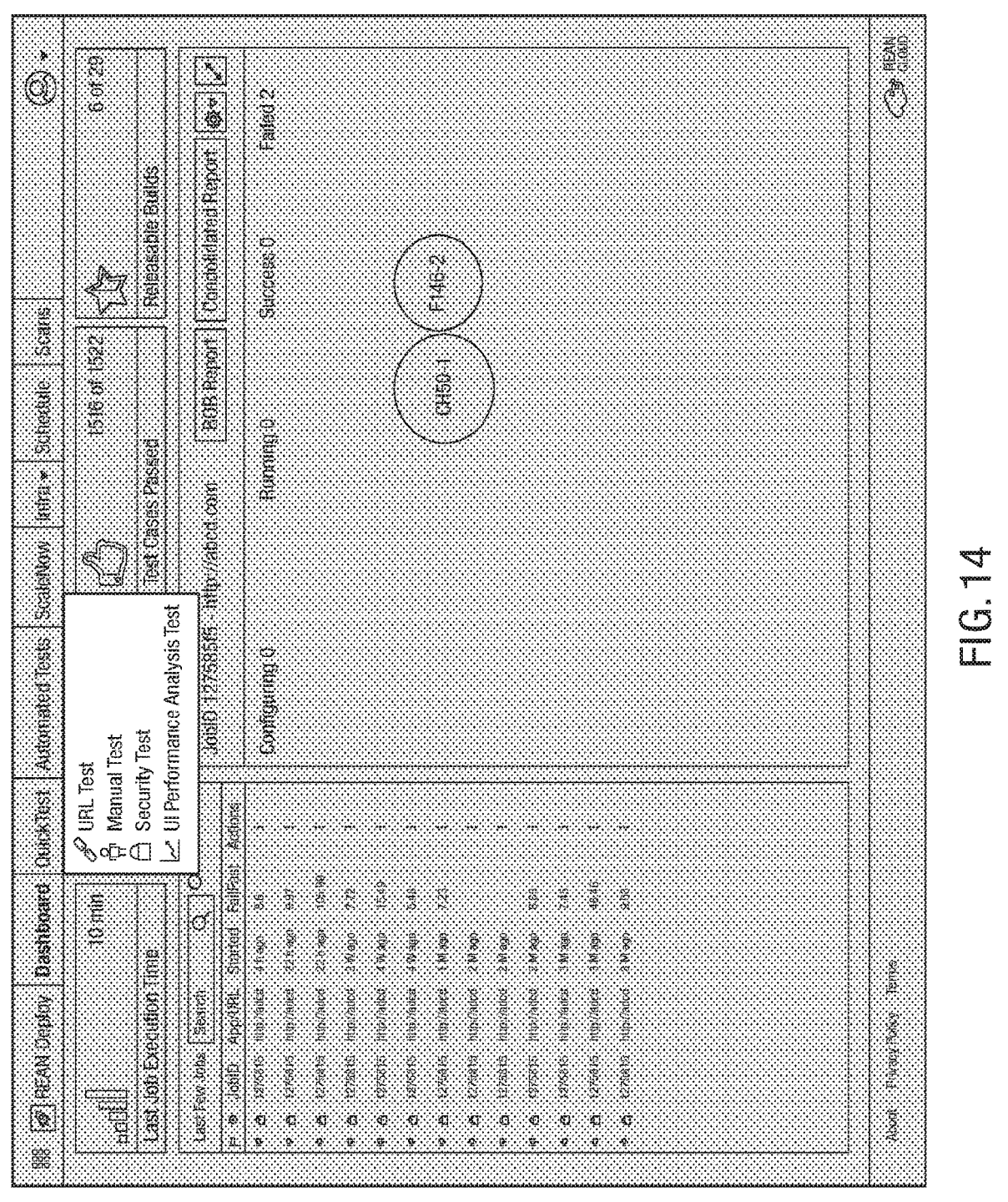

In one embodiment, users can choose to run different types of tests by clicking on a quick test button on the dashboard. FIG. 14 shows a test selection screen example according to one embodiment.

Examples of different tests a user can execute from cloud test software include:
1. URL test
2. Manual test
3. Security test
4. UI performance analysis test
5. Automated cross browser test
6. Scale test
7. Infrastructure test
8. Scheduled tests
9. Automated security scanning Example embodiments of each of these tests are described in the following paragraphs.

URL Test

URL test is used to test the availability of an application using different browsers and to examine the behavior of the application across different browser versions. To perform the URL test, cloud test software automatically installs a cloud-based server instance, then installs the software needed for each type of browser selected by the user. The user also provides a text string that URL test uses to identify correct application operation. URL test uses each selected browser and browser version to connect to the application URL and searches for the text string provided. The test passes if the provided text is found on the application page. In one example, the application page is a web page for the application being tested. This feature is used to check the availability of the application on different browsers and examine the behavior of the application across the different browser versions. FIG. 15 shows an example screenshot of URL test according to one embodiment.

In one embodiment, URL test is invoked with the following steps:
1. Log into cloud test software, and navigate to the URL test page using the links provided in the navigation bar at the top of the page.
2. Select browsers and browser versions by clicking on dropdown boxes. Multiple versions of the same browser as well as multiple browsers can be selected.
3. Enter the application URL (e.g., in an "Application URL" input field). This is the URL to the web application under test.
4. Enter the text string to search within the application page. Existence of the text string in the page indicates URL test success.
5. Enter a timeout limit (in seconds). Cloud test software will stop trying to access the application page on timeout expiration.
6. Select efficient or boost execution strategy. When efficient strategy is selected, cloud test software installs the minimum number of servers required to run URL test. When boost strategy is selected, enough servers are installed to run all selected browsers in parallel to finish the job more quickly.

Once the test is submitted, users can wait for results. Cloud test software captures screenshots for each test executed and indicates pass or fail.

Manual Test

Figure 16:
FIG. 16 shows a manual test screen according to one embodiment.

Manual test allows users to setup browser instances to enable users to manually run browser tests. After the user selects browsers to test, manual test automatically creates the infrastructure needed to run the tests. This significantly reduces the effort to create the setup, and the user can concentrate on the actual test use case. FIG. 16 shows an example screenshot of manual test according to one embodiment.

To use manual test, the user performs the following steps:
1. Log into cloud test software, and navigate to the manual test page using the links provided in the navigation bar at the top of the page.
2. Select browsers and browser versions by clicking on dropdown boxes.
3. Click on a "Start Now" button.
4. This initiates the creation of a server with the selected browsers.
5. Once the instance is configured with the browsers, the user will see a grayed image of the browsers just below a heading titled "Open Browsers".
6. The user clicks on a "Click to Open" button.
7. The user then waits for the grayed image of the browser to change. This indicates that the browser creation is complete.
8. The user then clicks on the browser icon to open a new browser window.
9. Multiple versions of the same browser can be opened by repeating steps two through eight.

The user now has access to a running virtual machine and the browser is ready for use. The user can create as many browser instances as required. Once testing is complete, the user can delete the virtual machine.

Security Test

Security test runs a security check for an application. Security tests are run using suites of security tests called security packs. A security pack contains a list of security checks that are performed against the application. Any security pack within security test can be run against an application and a detailed analysis of the results is displayed. FIG. 17 shows an example screenshot of security test according to one embodiment.

Security test is invoked with the following steps:
1. Log into cloud test software, and navigate to the security test page using the links provided in the navigation bar at the top of the page.
2. Select browsers and browser versions by clicking on dropdown boxes. Multiple versions of the same browser as well as multiple browsers can be selected.
3. Enter application URL into the "Application URL" box.
4. Select security packs to run against the application.

Once the security tests have run, test results can be viewed in the App Scan and HTTP Header test results sections by clicking on a test bubble icon.

UI Performance Analysis Test

Figure 18:
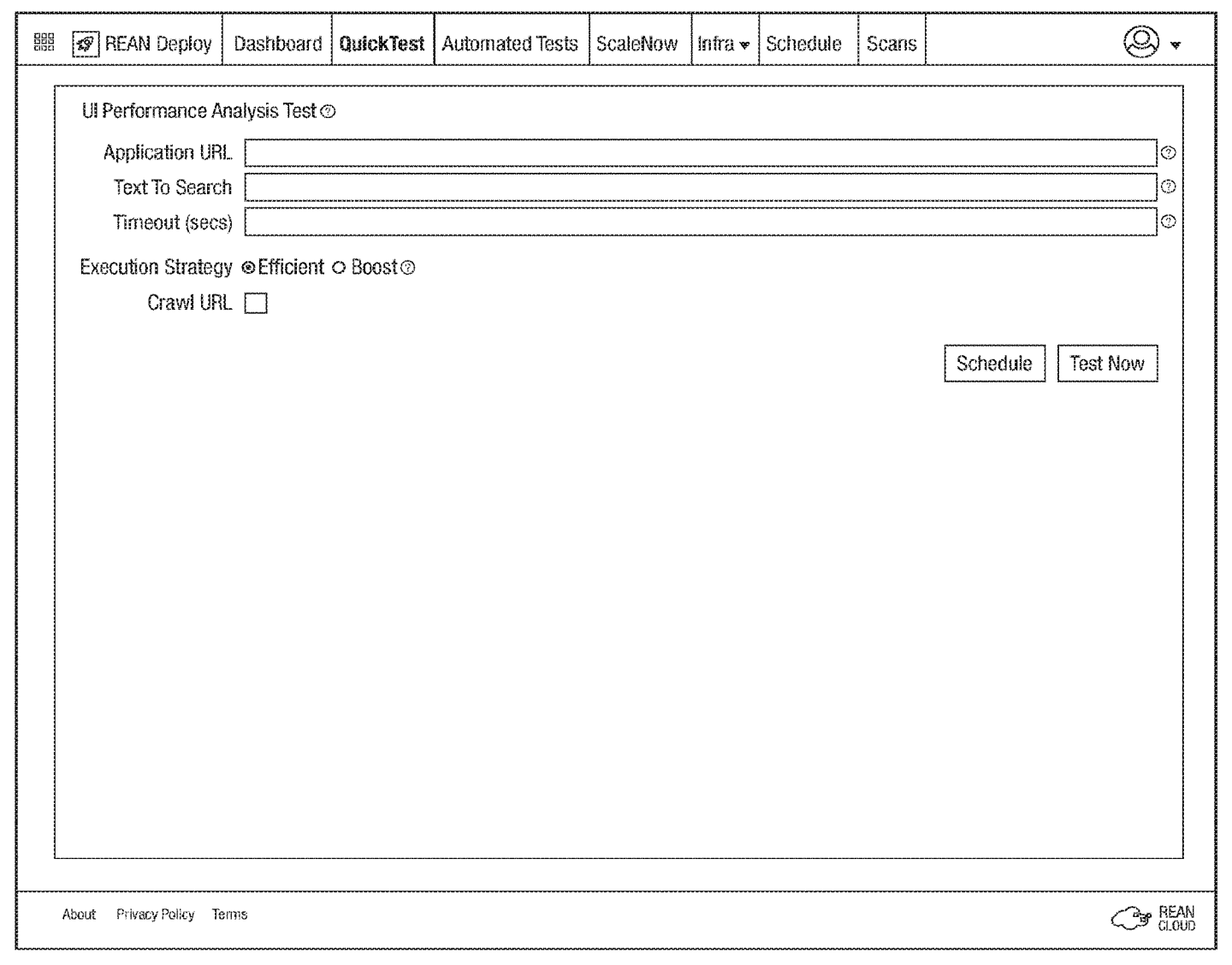

UI performance analysis runs a test of the application user interface code performance. A URL test or automated cross browser test can be run and a detailed analysis of the application UI code performance showing UI page loading results is generated. This can include metrics on the latency of objects loading. FIG. 18 shows an example screenshot of a UI performance analysis test according to one embodiment.

In one embodiment, a UI performance analysis test is invoked with the following steps:

1. Log into cloud test software, and navigate to the UI performance analysis test page using the links provided in the navigation bar at the top of the page.
2. Enter test parameters.
3. Run the test.
4. When the test starts, bubbles for the selected UI performance analyses are visible on the dashboard.
5. Once the job is complete, clicking on the UI performance analysis bubble displays a detailed UI performance analysis results report page.

Automated Cross Browser Test

Figure 19:
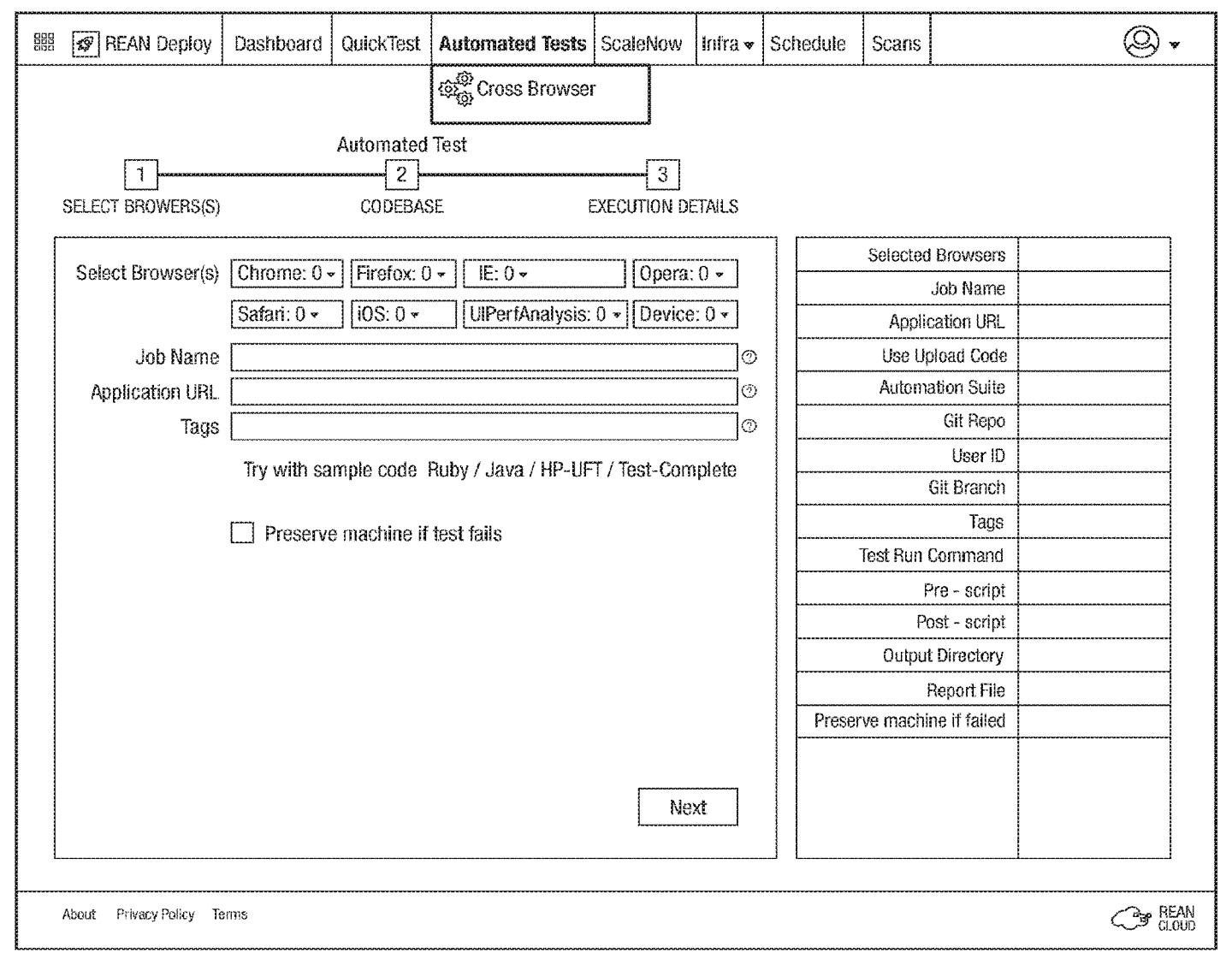

Automated cross browser test covers automation testing for the application across a range of browsers. Users can select the browsers, browser versions and test cases to execute using those browsers. In one embodiment, test cases can be stored in a repository for storing code artifacts (e.g., a Git repository or other data repository). In one embodiment, the code artifacts can include one or more of the blueprint components used with the cloud deploy software above. In one embodiment, the test cases can be stored in a repository that stores other forms of code instead of, or in addition to, code artifacts. Test cases are downloaded from the repository and executed against the application across all selected browsers. Cloud test software automates test infrastructure creation, instantiating browsers, importing test cases from a repository (e.g., Git repository) and executing test cases. This can significantly reduce user effort and accelerate the testing process. FIG. 19 shows an example screenshot of automated cross browser test according to one embodiment.

In one embodiment, automated cross browser test is invoked with the following steps:
1. Log into cloud test software, and navigate to the automated cross browser test page using the links provided in the navigation bar at the top of the page.
2. Select browsers and browser versions by clicking on dropdown boxes. Multiple browsers and browser versions can be selected.
3. Enter a unique job name to identify the test.
4. Enter the application URL for the application under test.
5. Enter the repository name from which test cases are to be downloaded (e.g., Git repository).
6. Enter the repository user name and password to enable repository access.
7. Enter the repository branch name from which test cases are to be downloaded.
8. Enter the command string used to run the test cases.
9. Enter any pre-script that needs to be executed before test cases are executed.
10. Enter the directory where test execution results are to be saved.
11. Enter a name for the report file that is generated after test execution is complete.

Once the test is submitted, cloud test software instantiates the test infrastructure, provisions the selected browsers and runs the test cases downloaded from the repository. If a browser test fails, the test can be paused to investigate the failed browser. Cloud test software captures screenshots for each test executed, for example, once each test is completed.

Scale Test

Figure 20:
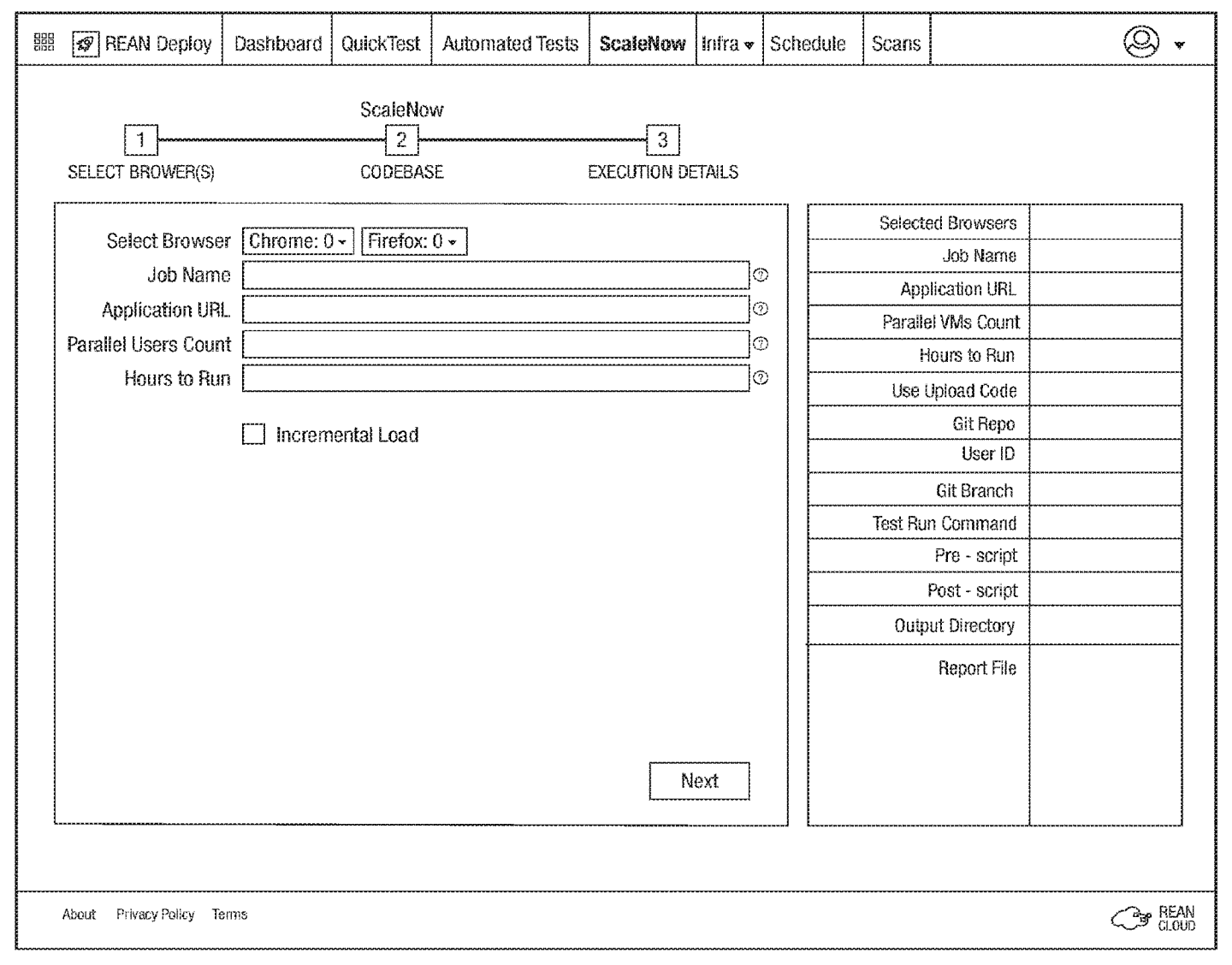

In one embodiment, cloud test software includes a scale test that can perform load testing using cloud based infrastructure. Load testing in this context refers to the ability to execute multiple user sessions against an application to test application stability. Scale test can perform application load testing using a range of browsers. The number of browser instances and browser versions that are deployed to execute a scale test are user selectable. Scale test may also include the ability to specify a time period for which to run the test and may also include a repository specification (e.g., a Git repository) from which to pull test cases to be executed against the application. Cloud test software will then execute the specified test cases on all selected browsers simultaneously for the specified time period. Using Scale test, users can more readily perform tasks like break-point analysis to identify application scalability limits. FIG. 20 shows an example screenshot of a scale test according to one embodiment.

In one embodiment, a scale test is invoked with the following steps:
1. Log into cloud test software, and navigate to the scale test page using the links provided in the navigation bar at the top of the page.
2. Select the browser and browser version by clicking on dropdown boxes. Multiple browsers and browser versions can be selected.
3. Enter a job name for the test.
4. Enter the URL for the application under test.
5. Enter the number of parallel users to be simulated during the test.
6. Enter the number of hours for the test suite to run.
7. Enter the repository name from which test suites are to be downloaded (e.g., Git repository).
8. Enter repository user name and password to enable repository access.
9. Enter the repository branch from which the test suites are to be downloaded.
10. Enter the command string used to run the test cases.
11. Enter any pre-script that needs to be executed before the test case is executed.
12. Enter the directory where test execution results are to be saved.
13. Enter a name for the report file that is generated after test execution is complete.

In one embodiment, scale test generates a report that shows different test run metrics such as success/fail count for each test, time taken for each test, and time taken for the, for example, top ten test cases. Cloud test software may also include an option to export the report in various formats (e.g., PDF format).

There are three types of reports in the scale test report:
1. Success/Fail count for each test: This test report shows the overall success and failure count for each test.
2. Time taken for each test cycle: This report shows the time (in minutes) taken to complete a single test.
3. Top 10 test cases: This test reports the time taken for the top 10 test cases in terms of time they took to complete.

Infrastructure Test

Figure 21:
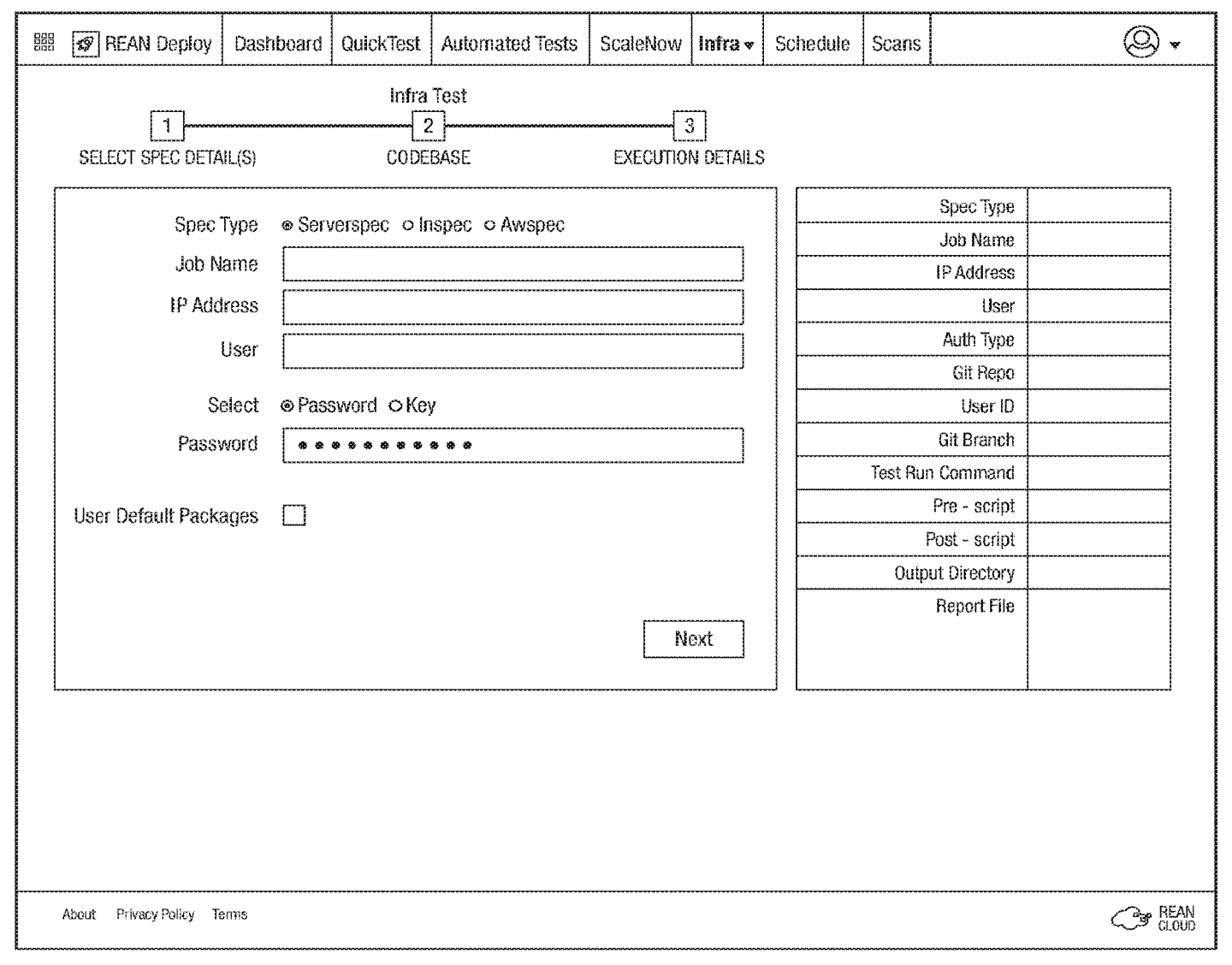

In one embodiment, cloud test software includes an infrastructure test. Infrastructure test validates that the cloud infrastructure created is the same as the cloud infrastructure specified. In one embodiment, the cloud infrastructure can be created using the cloud deploy software discussed above, and the specification of the cloud infrastructure is provided by the one or more blueprints used by the cloud deploy software (e.g., to generate infrastructure as code). Infrastructure test may use a cloud testing framework (e.g., ServerSpec, Inspec or Awspec) to verify cloud infrastructure. FIG. 21 shows an example screenshot of an infrastructure test according to one embodiment.

In one embodiment, an infrastructure test is invoked with the following steps:

1. Log into cloud test software, and navigate to the infrastructure test page using the links provided in the navigation bar at the top of the page.
2. Select the scan type (e.g., Serverspec/Inspec/Awspec).
3. Enter the Internet Protocol (IP) address of the instance under test.
4. Enter user information.
5. Select the option for password or key.
6. Enter the password or key.
7. Select the default packages option if required.
8. Enter the repository name from which test suites are to be downloaded (e.g., Git repository).
9. Enter repository user name and password to enable repository access.
10. Enter the repository branch from which test suites are to be downloaded.
11. Enter the command string used to run the test cases.
12. Enter any pre-script that needs to be executed before the test case is executed.
13. Enter the directory where test execution results are to be saved.
14. Enter a name for the report file that is generated after test execution is complete.

Scheduled Tests

Figure 22:
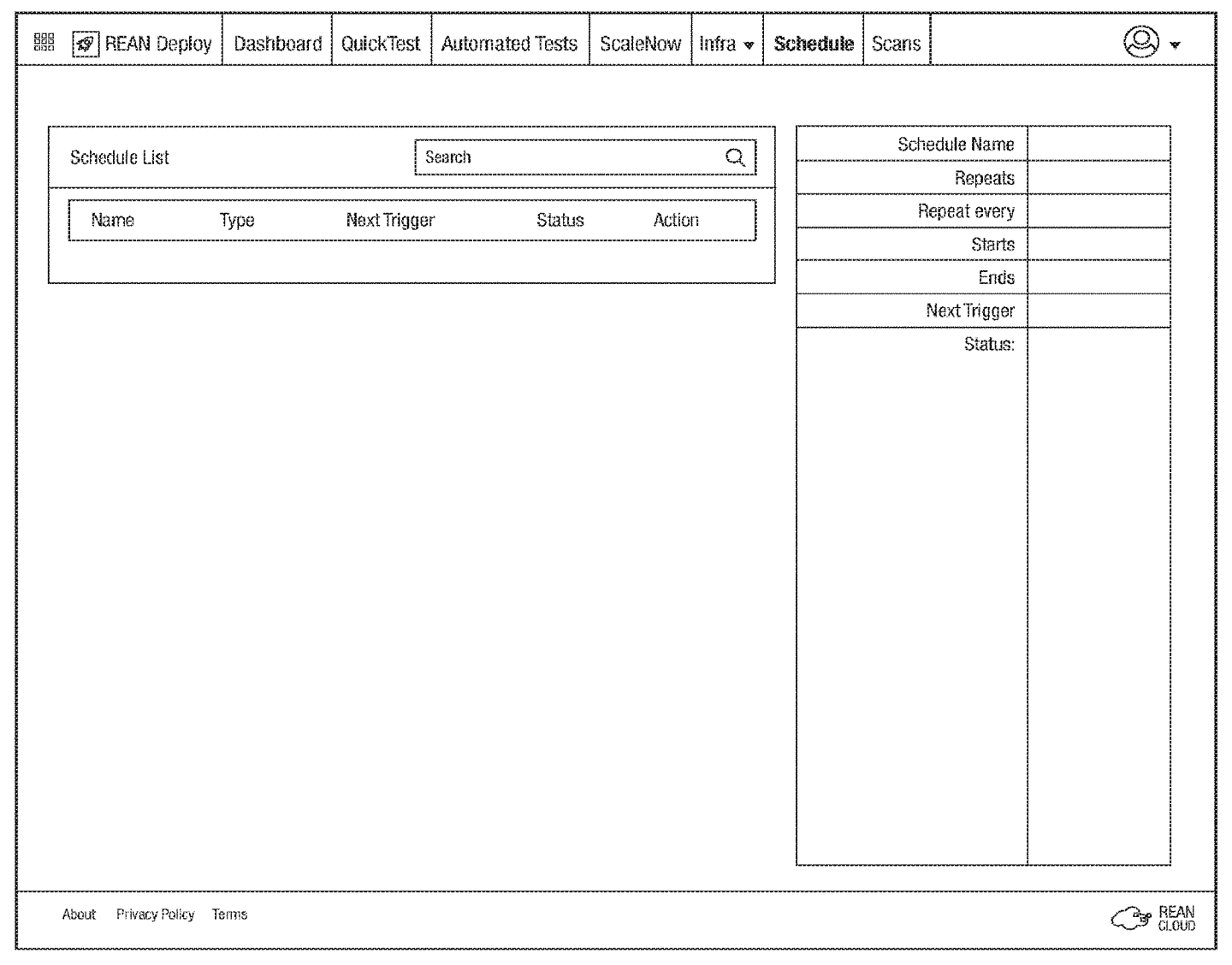

Cloud test software can include a scheduled tests feature that enables scheduling tests to be executed at specific times. Scheduled testing can be set up for many of the tests included within the cloud test software (e.g., URL test, security test, UI performance test, automated cross browser test, scale test and infrastructure test). This can also include a facility to repeat tests at any predetermined schedule. With this feature, tests can be run synchronously or asynchronously at scheduled times. FIG. 22 shows an example screenshot of scheduled tests according to one embodiment.

Automated Security Scanning

Figure 23:
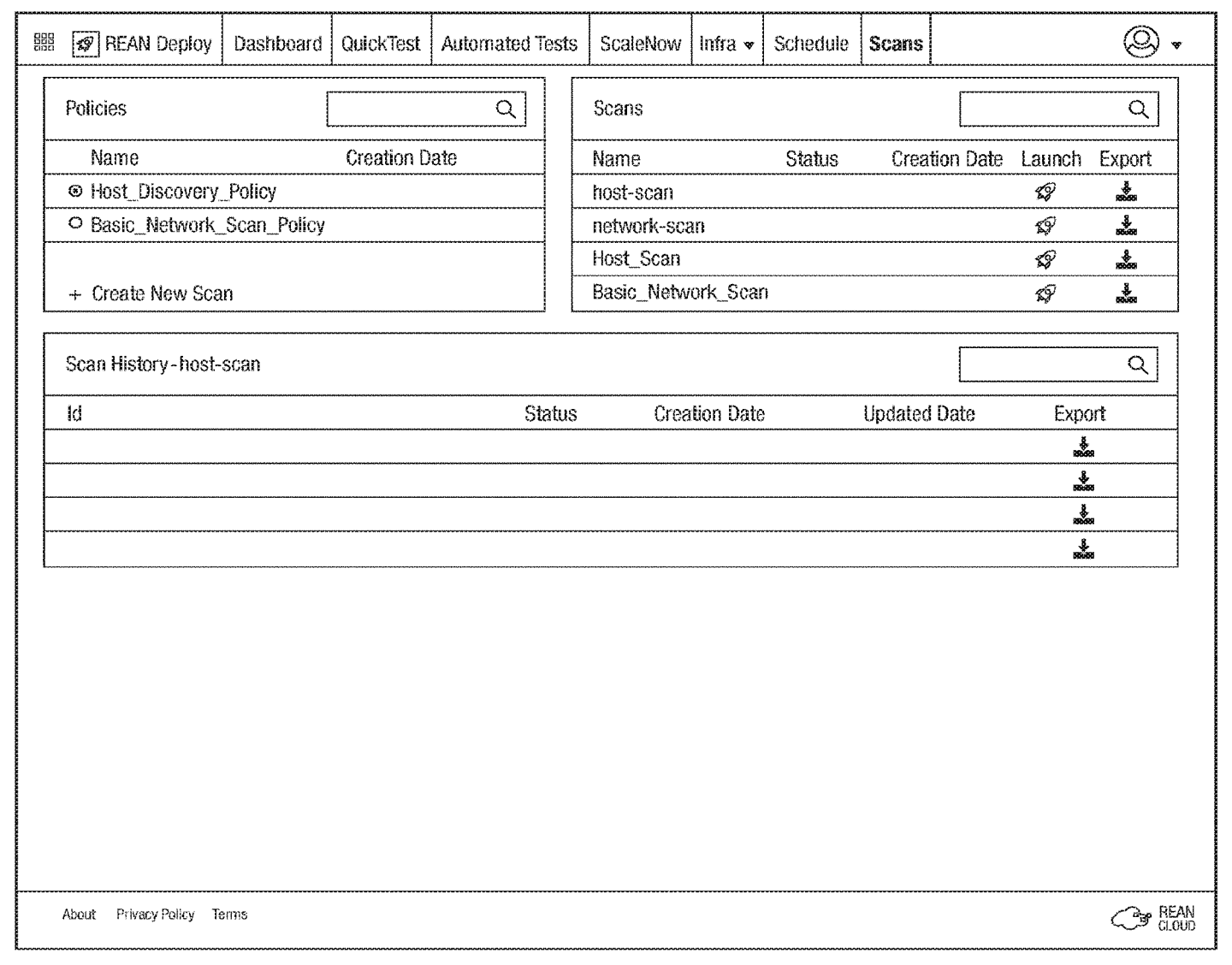

Cloud test software may also integrate with external security scanning platforms to run vulnerability scans. These scans may assess the security impact of a software build in real time. With this feature, the results of an automated security scan test (e.g., Nessus) can be viewed from within the cloud test software platform. FIG. 23 shows an example screenshot of automated security scanning according to one embodiment.

To support automated security scans, cloud test software can include software plug-ins (e.g., a Jenkins plug-in) with the capability to drive automated continuous testing. These plug-ins can incorporate testing into an application continuous integration pipeline. With these plug-ins, automated testing can be initiated every time an associated software build pipeline is initiated (e.g., with a Jenkins plug-in installed on a Jenkins server). Cloud test software may be configured to initiate the execution of a URL test, an automated cross browser test or both using the plug-in. Cloud test software may also be configured to send notification (e.g., an email) to configured recipients when test execution is complete. The notification may include a link to display test results.

Variations of Cloud Test Software

Various additional embodiments for cloud test software are now described below. In one embodiment, a method comprises: generating, by at least one computing device, testing infrastructure on a cloud; and testing, using the testing infrastructure, an application.

In one embodiment, the application has a web interface that can be viewed in a browser, and testing the application comprises: instantiating a browser in the testing infrastructure; importing at least one test case from a repository; and executing the at least one test case for the application. In one example, the browser is used to view an application user interface.

In one embodiment, testing the application comprises generating traffic from at least one server installed on the cloud.

In one embodiment, the method further comprises: generating code based on at least one blueprint; and deploying a cloud infrastructure to the cloud using the generated code; wherein testing the application comprises validating that the deployed cloud infrastructure conforms to at least one configuration or resource defined in the at least one blueprint. In one example, cloud infrastructure is cloud hardware and software needed to run an application (e.g., a shopping application that displays items for sale and manages sales transactions). In one example, testing infrastructure is hardware and software needed to exercise the application (e.g., by using a separate set of servers that simulate many users logging into the shopping application and performing many simultaneous transactions).

In one embodiment, the testing infrastructure comprises testing scripts executed to gather results for validating that the deployed cloud infrastructure conforms to at least one configuration or resource defined in the at least one blueprint.

In one embodiment, the method further comprises receiving a user selection that identifies at least one browser, wherein generating testing infrastructure on the cloud comprises: installing at least one server instance on the cloud; and installing software for each identified at least one browser.

In one embodiment, the method further comprises importing test cases from a repository, wherein testing the application comprises executing the test cases against the application. In one example, browser software is used to view the application user interface. Some tests will exercise the application user interface with results visible in a browser. Some tests can be run by applications that are not browsers (e.g., Fiddler).

Closing

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an application-specific integrated circuit (ASIC) or a field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, software development kit (SDK) component, web services, or other specific application, component, program, object, module or sequence of instructions referred to as "computer programs." Invocation interfaces to these routines can be exposed to a software development community as an API. The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., compact disk read-only memory (CD ROMs), digital versatile disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

No claim element herein is to be construed under the provisions of 35 U.S.C. 112, sixth paragraph, unless the element is expressly recited using the phrase "means for."

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
generating, by at least one computing device, testing infrastructure on a cloud;
receiving a string to search within a page of an application;
testing, using the testing infrastructure, the application, wherein the testing comprises searching for the string, and determining whether the string is found on the page; and
in response to determining that the string is found on the page, determining that testing the application is successful.

2. The method of claim 1, wherein the application has a web interface that can be viewed in a browser, and wherein testing the application further comprises:
instantiating a browser in the testing infrastructure;
importing at least one test case from a repository; and
executing the at least one test case for the application.

3. The method of claim 1, wherein testing the application further comprises generating traffic from at least one server installed on the cloud.

4. The method of claim 1, further comprising:
generating code based on at least one blueprint; and
deploying a cloud infrastructure to the cloud using the generated code;
wherein testing the application further comprises validating that the deployed cloud infrastructure conforms to at least one configuration or resource defined in the at least one blueprint.

5. The method of claim 4, wherein the testing infrastructure comprises testing scripts executed to gather results for validating that the deployed cloud infrastructure conforms to at least one configuration or resource defined in the at least one blueprint.

6. The method of claim 1, further comprising receiving a user selection that identifies at least one browser, wherein generating testing infrastructure on the cloud comprises:
installing at least one server instance on the cloud; and
installing software for each identified at least one browser.

7. The method of claim 6, further comprising importing test cases from a repository, wherein testing the application further comprises executing the test cases against the application.

8. The method of claim 6, further comprising receiving a link, wherein testing the application further comprises connecting, using each of the identified at least one browser, to the application using the link.

9. The method of claim 8, wherein the link is a uniform resource locator (URL) to the application.

10. The method of claim 1, wherein testing the application further comprises:
instantiating browsers in the testing infrastructure;
importing test cases from a repository; and
simultaneously executing the test cases using the browsers.

11. The method of claim 1, wherein testing the application further comprises executing multiple user sessions against the application to test stability of the application.

12. The method of claim 1, wherein testing the application provides test results, the method further comprising:
receiving, via a user interface, a user selection that identifies browsers;
instantiating the browsers in the testing infrastructure; and
causing display of the test results on the user interface.

13. The method of claim 12, wherein display of the test results comprises presenting a graphical object or image corresponding to each respective browser, and wherein a size or color of the graphical object or image indicates a characteristic associated with testing the respective browser.

14. A system comprising:
at least one processor; and
memory storing instructions configured to instruct the at least one processor to:
receive an identification of at least one browser;
receive a link to an application;
generate testing infrastructure on a cloud, wherein the generating comprises installing software for each of the identified at least one browser; and
test, using the testing infrastructure, the application, the testing comprising connecting, using each of the identified at least one browser, to the application using the link.

15. The system of claim 14, wherein generating the testing infrastructure further comprises instantiating the testing infrastructure on the cloud, and wherein the instructions are further configured to instruct the at least one processor to:
determine whether testing the application has been completed; and
in response to determining that testing the application is complete, delete the testing infrastructure from the cloud.

16. The system of claim 14, wherein testing the application further comprises validating that a deployed cloud infrastructure used to run the application conforms to at least one blueprint used to generate code for deployment of the deployed cloud infrastructure.

17. A non-transitory computer-storage medium storing instructions configured to instruct at least one computing device to:
generate code based on at least one blueprint;

deploy a cloud infrastructure to a cloud using the generated code;
generate testing infrastructure on the cloud; and
test, using the testing infrastructure, an application, wherein testing the application comprises validating that the deployed cloud infrastructure conforms to at least one configuration or resource defined in the at least one blueprint.

\* \* \* \* \*